United States Patent
Shiomi

(10) Patent No.: US 12,002,385 B2
(45) Date of Patent: Jun. 4, 2024

(54) LAMINATE AND LABEL

(71) Applicant: NIPPON CARBIDE INDUSTRIES CO., INC., Tokyo (JP)

(72) Inventor: Kyoko Shiomi, Namerikawa (JP)

(73) Assignee: NIPPON CARBIDE INDUSTRIES CO., INC., Tokyo (JP)

( * ) Notice: Subject to any disclaimer, the term of this patent is extended or adjusted under 35 U.S.C. 154(b) by 381 days.

(21) Appl. No.: 17/414,096

(22) PCT Filed: Dec. 20, 2019

(86) PCT No.: PCT/JP2019/050069
§ 371 (c)(1),
(2) Date: Jun. 15, 2021

(87) PCT Pub. No.: WO2020/130130
PCT Pub. Date: Jun. 25, 2020

(65) Prior Publication Data
US 2022/0044596 A1    Feb. 10, 2022

(30) Foreign Application Priority Data

Dec. 21, 2018 (JP) .................. 2018-240071

(51) Int. Cl.
*G09F 3/02* (2006.01)
*B23K 26/53* (2014.01)
*B32B 7/023* (2019.01)
*B32B 7/12* (2006.01)
*C09J 7/29* (2018.01)
*B32B 7/06* (2019.01)

(52) U.S. Cl.
CPC ............... *G09F 3/02* (2013.01); *B23K 26/53* (2015.10); *B32B 7/023* (2019.01); *B32B 7/12* (2013.01); *C09J 7/29* (2018.01); *B32B 7/06* (2013.01); *B32B 2255/10* (2013.01); *B32B 2255/26* (2013.01); *B32B 2519/00* (2013.01); *C09J 2203/334* (2013.01); *C09J 2301/416* (2020.08); *C09J 2400/123* (2013.01); *C09J 2467/006* (2013.01); *G09F 2003/0201* (2013.01); *G09F 2003/0225* (2013.01); *G09F 2003/023* (2013.01); *G09F 2003/0257* (2013.01)

(58) Field of Classification Search
None
See application file for complete search history.

(56) References Cited

U.S. PATENT DOCUMENTS

| | | | |
|---|---|---|---|
| 6,423,399 B1 | 7/2002 | Endo et al. | |
| 2002/0051930 A1* | 5/2002 | Ozawa | B44B 7/002 430/945 |
| 2009/0297799 A1 | 12/2009 | Nakasone et al. | |
| 2010/0189979 A1* | 7/2010 | Takeda | B32B 27/30 428/220 |
| 2011/0151210 A1 | 6/2011 | Siebert et al. | |
| 2012/0276359 A1 | 11/2012 | Takeda et al. | |
| 2014/0072791 A1 | 3/2014 | Takeda et al. | |
| 2018/0350271 A1 | 12/2018 | Schmitt et al. | |

FOREIGN PATENT DOCUMENTS

| | | |
|---|---|---|
| CN | 101203380 A | 6/2008 |
| CN | 101754863 A | 6/2010 |
| EP | 2298665 A1 | 3/2011 |
| JP | H9-123606 A | 5/1997 |
| JP | H9-277707 A | 10/1997 |
| JP | 2007-106087 A | 4/2007 |
| JP | 2009-119658 A | 6/2009 |
| JP | 2010-089365 A | 4/2010 |
| JP | 2012-501873 A | 1/2012 |
| JP | 2016-215611 A | 12/2016 |
| JP | 2017-048264 A | 3/2017 |
| JP | 6342042 B1 | 6/2018 |
| WO | 2009/147825 A1 | 12/2009 |

OTHER PUBLICATIONS

Office Action dated Oct. 10, 2022, issued in counterpart CN application No. 201980084657.1 with English translation. (19 pages).
International Search Report dated Mar. 17, 2020, issued in counterpart International application No. PCT/JP2019/050069. (3 pages).
Notification of Transmittal of Translation of the International Preliminary Report on Patentability (Form PCT/IB/338) issued in counterpart International application No. PCT/JP2019/050069 mailed Jul. 1, 2021 with Forms PCT/IB/373 and PCT/ISA/237. (6 pages).
Office Action dated Oct. 10, 2022, issued in counterpart application No. 201980084657.1 with English translation. (19 pages).

* cited by examiner

*Primary Examiner* — Sheeba Ahmed
(74) *Attorney, Agent, or Firm* — WHDA, LLP

(57) ABSTRACT

Provided is a laminate and label for laser printing which are capable of preventing or reducing the occurrence of failure in printing by laser light irradiation. A laminate (1) is at least a laminate for laser printing, including a first layer (31) having a property of shielding against laser light, a second layer (32) having a property of absorbing the laser light, and a base material layer (33) which is optically transparent, which are stacked in the order named. The second layer (32) may have a thickness of not more than 15 μm, and may have a specific composition.

17 Claims, 2 Drawing Sheets

LAMINATE AND LABEL

TECHNICAL FIELD

The present invention relates to a laminate and a label.

BACKGROUND ART

For the purpose of product management or quality assurance, a label or sheet on which distinctive information such as a manufacturer's serial number or best-before date is printed is generally attached to each product. The distinctive information is printed as, for example, a bar code. A known example of the label or the sheet is a laminate on which printing is carried out by irradiation with laser. A known example of the laminate is a laminate composed of a white layer containing titanium oxide and a black layer containing carbon black which are directly stacked together. Another known example of the laminate is a laminate composed of a transparent base material and colored layers disposed on both surfaces of the transparent base material. There is a visible color difference between the colored layers, and the color layers can be removed by irradiation with laser light. The laminate has, for example, a titanium oxide layer on one surface of the transparent resin base material, and has a carbon black layer on the other surface of the resin base material (for example, see Patent Literature 1). FIG. 4 schematically illustrates an example of a layer configuration of the laminate.

As illustrated in FIG. 4, a laminate 100 is constituted by a white layer 51 containing titanium oxide, a transparent PET film 52, a black layer 53 containing carbon black, a transparent adhesive layer 54, and release paper 55, which are stacked in the order named. Arrow B in FIG. 4 indicates the direction in which laser light travels and the position to be irradiated with the laser light.

With regard to the laminate 100, once the white layer 51 has been irradiated with laser light, in a case of $CO_2$ laser, the white layer 51 is etched to have a hole 30 which will become a print portion, and the PET film 52 is exposed. The laser light is scanned, and thereby the shape of the hole 30, when seen in plan view, becomes a desired shape. Because of the contrast in color between the white layer 51 and the black layer 53, an image corresponding to the desired shape is formed on the laminate 100.

CITATION LIST

Patent Literature

[Patent Literature 1]
Japanese Patent Application Publication, Tokukai, No. 2007-106087

SUMMARY OF INVENTION

Technical Problem

However, when the foregoing laminate is irradiated with laser light for printing from the side where the layer of titanium oxide is located, the white layer 51 may not be etched and sufficient printing may not be achieved, depending on wavelength. Furthermore, with regard to a laminate composed of a white layer containing titanium oxide and a black layer containing carbon black which are directly stacked together, if the laminate is irradiated with laser light such as that which penetrates the layer of titanium oxide, the layer of carbon black is also etched and a through hole is included in the print portion in some cases.

On the other hand, in cases where the foregoing laminate is used for a process control label, the label is typically small. Therefore, it is necessary to print information densely so that the printed information does not extend off an intended area. Therefore, the laminate is required to have high dimensional stability in some cases.

However, with the conventional laminate 100, heat resulting from the irradiation with laser light is transmitted to and accumulated in the black layer 53 in some cases. This may make the PET film 52 soft. Therefore, characters or a two-dimensional code formed by laser printing may be distorted, and, as a result, the characters or the two-dimensional code may change in dimensions or printing with high definition may not be achieved. As such, the conventional technique still has room for consideration in terms of achieving laser printing with high definition.

A first object of the present invention is to provide a laminate for laser printing that is capable of preventing or reducing the occurrence of failure in printing by laser light irradiation and provide a label obtained by carrying out printing on the laminate by irradiation with laser light.

A second object of the present invention is to provide a laminate for laser printing on which printing with high definition can be achieved by laser printing.

Solution to Problem

In order to attain at least the first object, a laminate in accordance with an aspect of the present invention is a laminate for laser printing, including: a first layer having a property of shielding against laser light; a second layer having a property of absorbing the laser light; a base material layer which is optically transparent; and a third layer having a property of absorbing the laser light, the first layer, the second layer, the base material layer, and the third layer being stacked in the order named. The second layer has a thickness of not more than 15 μm, and the third layer further has the same hue as the second layer.

In order to attain at least the first object, a label in accordance with an aspect of the present invention is a label including a print portion which has been formed by irradiating the laminate with laser light. The print portion is a portion in which the base material layer is exposed when seen from a side where the first layer is located.

In order to attain at least the second object, a laminate in accordance with an aspect of the present invention is a laminate for laser printing, including: a first layer having a property of shielding against laser light; a second layer having a property of absorbing the laser light; and a base material layer which is optically transparent, the first layer, the second layer, and the base material layer being stacked in the order named. The second layer contains a resin composition that contains a resin and a pigment that has a property of absorbing the laser light, and the resin contains a resin component that has a structure of a reaction product of an acrylic resin, a polycaprolactone polyol, and a polyisocyanate.

Note that, in the present specification, the "same hue" means that there is no or only a slight color difference that is difficult to visually recognize. For example, the difference between L values measured in specular component excluded (SCE) mode with a colorimeter (product name: CM-3500d, manufactured by Konica Minolta, Inc.) is less than 7, preferably less than 5. In the present specification, "different hues" means that there is a visible color difference, and that, for example, the difference between L values measured in SCE mode with a colorimeter (product name: CM-3500d, manufactured by Konica Minolta, Inc.) is 7 or more, preferably 10 or more.

Advantageous Effects of Invention

An aspect of the present invention makes it possible to provide a laminate for laser printing that is capable of preventing or reducing the occurrence of failure in printing by laser light irradiation or provide a label obtained by carrying out printing on the laminate by irradiation with laser light.

Another aspect of the present invention makes it possible to provide a laminate for laser printing on which printing with high definition can be achieved by laser printing.

DESCRIPTION OF EMBODIMENTS

The following description will discuss embodiments of the present invention. In the following description, a subject matter which is included in the present invention and which is to attain the foregoing first object may be referred to as a "first invention", whereas another subject matter which is included in the present invention and which is to attain the foregoing second object may be referred to as a "second invention".

Embodiment of the First Invention

[Laminate]

Figure 1:
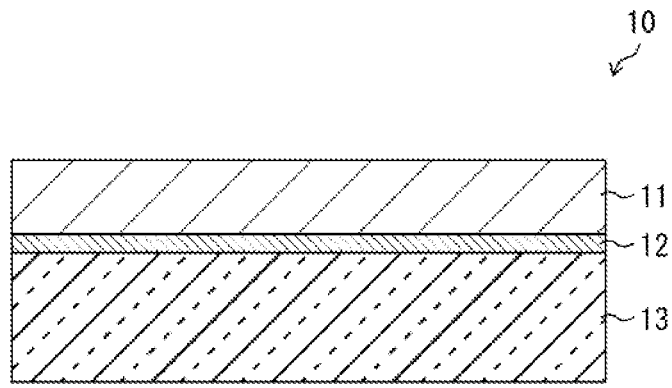
FIG. 1 schematically illustrates an example of a cross-sectional structure of a laminate in accordance with an embodiment of the present invention.

FIG. 1 schematically illustrates an example of a cross-sectional structure of a laminate in accordance with an embodiment of the present invention. As illustrated in FIG. 1, a laminate 10 includes a first layer 11, a second layer 12, and a base material layer 13. The first layer 11, the second layer 12, and the base material layer 13 are stacked in the order named. The laminate 10 is a laminate for laser printing.

In the present embodiment, "laser printing" means that the laminate 10 is irradiated with laser light from the side where the first layer 11 is located and thereby the first layer 11 and the second layer 12 are engraved. This is also referred to as "etching". The etching causes the first layer 11 and the second layer 12 to be engraved, resulting in exposure of the base material layer 13. In the following description, reference signs may be omitted.

[First Layer]

The first layer has the property of shielding against laser light. The property of shielding against laser light means including the property of reflecting laser light or the property of reflecting and absorbing laser light. The first layer may be a layer that contains a material having the property of shielding against laser light. Examples of the material for the first layer include metal oxides and metals. Therefore, the first layer is, for example, a layer that contains a metal and/or a metal oxide.

Generally, a metal oxide has both the property of reflecting laser light and the property of absorbing laser light (i.e., the property of shielding against laser light), and therefore such a metal oxide can be used as a material for the first layer. Examples of the metal oxide include titanium oxide, zinc oxide, iron oxide, alumina, silica, and mica. A metal generally has the property of reflecting laser light. Examples of the metal include aluminum and an alloy of copper and zinc. Of those listed above, titanium oxide is preferred as a material for the first layer in terms of whiteness and the ability to hide the second layer.

The first layer need only be configured such that the first layer is etched by irradiation with laser light. For example, the first layer may be a coating film obtained from slurry that contains (i) a dispersed phase which is particles of a metal oxide and/or a metal and (ii) a continuous phase which is a resin easily decomposable by heat. Alternatively, the first layer may be a vapor-deposited film obtained by depositing particles of a metal oxide and/or a metal.

The slurry may be ink or paint. The slurry may be prepared or may be commercial slurry.

It is preferable that the continuous phase be a resin easily decomposable by heat, in terms of carrying out precise etching even in a finely shaped part of a print portion by irradiation with laser light. The resin easily decomposable by heat may be one type of resin or two or more types of resins. Note that the "resin easily decomposable by heat" can also be described as a resin which, when irradiated with laser light, is decomposed by heat and becomes substantially inactive as the continuous phase in the coating film obtained from slurry. Examples of the resin easily decomposable by heat include thermosetting resins, acrylic resins, and butyral resins. The thermosetting resins are particularly preferably thermosetting resins with no softening point, from the foregoing point of view.

With regard to the thickness of the first layer, if the first layer is too thick, the first layer may not be sufficiently engraved with laser light irradiation, and printing failure may occur. Furthermore, it is necessary to increase the intensity of laser light in order to penetrate the first layer, which may adversely affect the layer(s) underneath the first layer (for example, the base material layer or the third layer, described later). In terms of sufficiently etching the first layer with laser light irradiation, the thickness of the first layer is preferably not more than 20 µm, more preferably not more than 15 µm, even more preferably not more than 10 µm.

On the contrary, if the first layer is too thin, there may be cases in which the first layer is not thick enough to hide, from sight from the first-layer side, the second layer and other layer(s) on the opposite side of the second layer from the first layer (hereinafter may be referred to as "second layer etc."). In terms of hiding the second layer etc. and achieving well-defined printing with laser light irradiation, the thickness of the first layer is preferably not less than 2 µm, more preferably not less than 6 µm, even more preferably not less than 10 µm.

For example, it is preferable that the first layer have a thickness of not less than 2 µm in terms of achieving a hue that sufficiently differs from the second layer etc. In particular, it is preferable that the first layer have a thickness of not less than 6 µm in terms of sufficiently achieving the ability of the first layer to hide the second layer etc.

The thickness of the first layer can be measured by a known method for measuring the thickness of a film. The thickness of the first layer can be adjusted by adjusting the amount of particles contained in slurry, the number of times the slurry is applied (which will be described later), and/or the like.

[Second Layer]

The second layer has the property of absorbing laser light. Any known material that has the property of absorbing laser light can be used as a material for the second layer. Examples of the material for the second layer include organic pigments that have the property of absorbing laser light. The organic pigments typically have the property of converting light energy into thermal energy. Therefore, the continuous phase (e.g., resin) in a part of the second layer which part is irradiated with laser light, when seen in plan view, is decomposed by light and heat. In terms of achieving printing with higher definition, it is preferable that the material for the second layer do not have the property of shielding against laser light. For example, it is preferable that the material for the second layer do not contain the foregoing metals or metal oxides.

Examples of the organic pigments not only include carbon black but also include: cyanine-based pigments which have a polymethine skeleton; nickel dithiolene-based pigments having a flat-tetrahedral coordination; squarylium-based pigments; naphthoquinone-based pigments; diimmonium-based pigments; azo-based organic pigments; and condensed polycyclic organic pigments such as phthalocyanine-based pigments, naphthalocyanine-based pigments, and azulenocyanine-based pigments. Examples of the azulenocyanine-based pigments include zinc (10, 12, 22, 24, 34, 36, 46, 48-octoctyl)2,3-azulenocyanine. Each of the organic pigments may be a commercial pigment. Examples of the commercial pigment include a near-infrared absorbing pigment "FDN-010" manufactured by YAMADA CHEMICAL CO., LTD. and a near-infrared absorbing pigment "YKR-2200" manufactured by Yamamoto Chemicals Inc. Of those listed above, the organic pigment is preferably carbon black for its high photothermal conversion efficiency.

The color that the second layer shows may be selected as appropriate according to, for example, the color that the first layer or some other layer other than the first and second layers shows, the color of a substrate on which the laminate is disposed, and/or the like, provided that the resulting printing is well defined enough.

The second layer need only be configured such that the second layer is decomposed upon irradiation with laser light to produce heat and/or gas. For example, the second layer may be a coating film obtained from slurry that contains (i) the foregoing organic pigment as a dispersed phase and (ii) the foregoing resin easily decomposable by heat as a continuous phase. The slurry may be composed of ink, paint or the like, and may be prepared or commercial slurry.

The thickness of the second layer is not more than 15 μm. When the thickness of the second layer is not more than 15 μm, it is possible to sufficiently etch the first layer together with the second layer with laser light irradiation.

Furthermore, when the thickness of the second layer is not more than 15 μm, it is possible to reduce the effects of heat generated during laser light irradiation on layer(s) other than the first and second layers. For example, it is possible to prevent or reduce the deformation of the base material layer (described later). Moreover, when the thickness of the second layer is not more than 15 μm, it is possible, in cases where the first layer is formed on the second layer, to make variations in thickness of the first layer small enough. For example, since the second layer has a thickness not more than 15 μm, the thickness of the first layer can be made accurate to within about 3 μm or less. This makes it possible to prevent or reduce the occurrence of printing failure that would be caused by the insufficiently etched first layer.

From the above point of view, the thickness of the second layer is preferably not more than 8 μm, more preferably not more than 6 μm.

The thickness of the second layer is not limited, provided that the second layer, together with the first layer, can be etched with laser light irradiation. The lower limit of the thickness of the second layer can be selected on the basis of some other reason. For example, in terms of stable and easy production of the second layer, the thickness of the second layer is preferably not less than 0.5 μm, more preferably not less than 1 μm, even more preferably not less than 2 μm.

The thickness of the second layer can be measured by a known method of measuring the thickness of a film. The thickness of the second layer can be adjusted as appropriate by, for example, the foregoing method of applying slurry. The thickness of the second layer can also be adjusted by, for example, polishing an existing layer.

[Base Material Layer]

The base material layer is optically transparent. The phrase "optically transparent" means that, for example, visible light transmittance is not less than 80% and laser light transmittance is not less than 50%. When the visible light transmittance of the base material layer is high enough, when the etched laminate (label) is seen in plan view from the side where the first layer is located, the substrate is sufficiently visible through the base material layer. In particular, when the hue is different between the first layer and the substrate, printing with good contrast to the first layer can be achieved.

The laser light absorptance of the base material layer is preferably low, in terms of eliminating or reducing the likelihood that a through-hole will be made by etching in the base material layer due to the effect of some other layer disposed on the opposite side of the base material layer from the second layer. On the other hand, the laser light transmittance of the base material layer is preferably high. When the transmittance is high, the reflection and scattering of laser light from the base material layer toward the second layer can be reduced, making it possible to achieve etching with higher definition. From such a point of view, the laser light transmittance of the base material layer may be 50% or more. The foregoing optical transparency of the base material layer may be uniform throughout the whole laminate or may differ from one portion to be etched to another.

Any material that typically has high transparency can be used as a material for the base material layer. Examples of such a material include glass, polyester resins, polycarbonate resins, acrylic resins, and urethane resins.

The shape of the base material layer is not limited. The thickness of the base material layer may be uniform or may vary within the laminate. The base material layer is preferably a resin film, because generally a laminate (or etched label) preferably has flexibility in terms of making the label usable for more purposes. The thickness of the film is not limited, and can be selected as appropriate, for example, in terms of handleability, provided that the foregoing through-hole will not be made during etching. From such a point of view, the thickness of the film may be, for example, 25 μm to 300 μm.

[Other Layer]

The laminate in accordance with the present embodiment may further include other features other than the foregoing first layer, second layer, and base material layer, provided that the effect of the present embodiment is achieved. Examples of such other features include a third layer, an adhesion layer, and a release layer.

(Third Layer)

The third layer is usually disposed such that the first layer, the second layer, the base material layer, and the third layer are stacked in the order named.

The third layer usually has the property of absorbing laser light. It is preferable that the third layer have the property of absorbing layer light in terms of preventing or reducing the reflection and scattering of laser light at the third layer and achieving etching with higher definition. The third layer can be configured similarly to the second layer, and, for example, may be a coating film obtained from slurry that contains (i) the foregoing organic pigment as a dispersed phase and (ii) a resin as a continuous phase. The slurry may be prepared or may be commercial slurry.

The thickness of the third layer is not limited, but is preferably sufficiently thick in terms of preventing the penetration of laser light during etching. From such a point of view, the thickness of the third layer is preferably not less than 10 μm, more preferably not less than 30 μm. The upper limit of the thickness of the third layer is not limited, and may be, for example, not more than 300 μm, from the viewpoint that the effect brought about by the third layer tops out at about this thickness.

The third layer is visible through the base material layer when seen from the side where the first layer is located, after etching. The third layer therefore preferably has a visible color difference from the first layer. The color difference can be selected as appropriate so that the third layer is visible, according to the color of the first layer.

The third layer preferably has the same hue as the second layer. When the hue of the third layer is the same as the hue of the second layer, the difference between the color of the third layer and the color of the second layer is difficult to recognize at the edge of a print portion formed by etching. This makes it possible to more clearly visually recognize the edge of the print portion.

The third layer may further have an adhesive property. The laminate or label is configured to be attached to a product, in some cases. It is preferable that the third layer have an adhesive property, in terms of imparting the adhesive property to the laminate or label with a simple configuration.

The third layer which has an adhesive property can be configured by, for example, using a resin that provides the adhesive property as a resin constituting the continuous phase of the third layer. Such a resin that has an adhesive property can be a known resin composition for forming an adhesion layer. The amount of the resin that has an adhesive property, contained in the third layer, can be selected as appropriate, provided that the adhesive property in addition to the effect of the present embodiment is achieved.

(Adhesion Layer)

The adhesion layer is a layer that has an adhesive property. The adhesion layer may be disposed on the base material layer or on the third layer in a case where the laminate in accordance with the present embodiment does not include the third layer or in a case where the third layer does not have an adhesive property. The adhesion layer may be a coating film obtained from a known resin composition serving as an adhesive agent, and can be prepared by a known method.

(Release Layer)

The release layer is a layer that detachably covers the layer that has an adhesive property of the laminate, and has the property of releasing the layer that has an adhesive property. The release layer can be constituted by, for example, a film that can be removed from the layer that has an adhesive property or a known release material such as release paper.

(Other)

The laminate in accordance with the present embodiment may further include another layer that lies between any of the foregoing layers, provided that the effect of the present embodiment is achieved. Examples of such a layer that lies between any of the foregoing layers include another adhesion layer that bonds any of the foregoing layers, an intermediate layer that is formed between two layers adjacent to each other in the direction along which the layers are stacked and that contains the compositions of the two layers, a barrier layer for protection of any of the layers, and a primer layer and anchor layer for enhancing the adhesion between two layers.

[Method of Producing Laminate]

The laminate in accordance with the present embodiment can be formed by disposing or forming the foregoing layers so that the layers are stacked in the order named.

For example, the laminate can be produced by a production method including the following two steps (1) and (2). The production method may further optionally include at least one of the following steps (3) to (5).

(1) A step of applying slurry for a second layer on one surface of a base material layer in the form of a film and drying the slurry to form the second layer.

(2) A step of applying slurry for a first layer on a surface of the second layer and drying the slurry to form the first layer.

(3) A step of applying slurry for a third layer on the other surface of the base material layer and drying the slurry to form the third layer.

(4) A step of applying a resin composition for an adhesive on the other surface of the base material layer or on a surface of the third layer to form an adhesion layer.

(5) A step of attaching a release material to the adhesion layer.

In the production method described above, slurry or adhesive can be applied by a known coating method suitable for a desired film. Examples of such a coating method include screen printing, gravure printing, bar coating, knife coating, roll coating, comma roll coating, blade coating, die coating, spray coating, electrostatic coating, and dip coating.

In the production method described above, the applied slurry can be dried by a known method suitable for the material for the slurry. Examples of such a drying method include drying with hot air and heating using a heating apparatus such as an oven or a hot plate. With regard to drying the layers made of slurry formed by application (slurry layers), each slurry layer may be dried once it has been formed or a plurality of or all slurry layer(s) and coating film(s) may be dried at a time.

Alternatively, the laminate in accordance with the present embodiment can be produced by preparing any two of the following layers: the first layer, the second layer, the base material layer, and the third layer in advance, and heating and laminating the two layers. Alternatively, the laminate can be produced by bonding prepared two layers together with the foregoing additional adhesion layer therebetween and laminating the two layers.

Alternatively, the laminate in accordance with the present embodiment can be produced by preparing slurry layers for the respective layers one by one from one end in the direction along which the layers are stacked, and drying the slurry layers. For example, the laminate can be produced by: forming a coating film for a first layer on a process film; forming a coating film for a second layer on the coating film for the first layer; forming a coating film for a base material layer on the coating film for the second layer; forming a slurry layer for a third layer on the coating film for the base material layer; drying the coating films and slurry layer; and removing the process film.

The amount of the dispersed phase in slurry for each layer can be reduced when the slurry is applied many times. Therefore, the composition of the slurry can be selected as appropriate according to the number of times the slurry is applied, provided that the formation of layers having desired composition is achieved.

In a case where each slurry layer is formed by applying slurry once, the amount of metal oxide particles or metal particles in the slurry for the first layer may be, for example, 15 parts by mass to 150 parts by mass with respect to 100 parts by mass of a resin as a continuous phase. The amount of organic pigment particles in the slurry for the second layer may be 4 parts by mass to 50 parts by mass with respect to 100 parts by mass of the resin as a continuous phase. In particular, when the organic pigment particles are contained in an amount of 7 parts by mass to 35 parts by mass, characters having a clear shape are printed. The amount of organic pigment particles in slurry for the third layer may be 7 parts by mass to 50 parts by mass with respect to 100 parts by mass of the resin as a continuous phase.

The laminate in accordance with the present embodiment can be suitably used for a label that has a print portion etched by irradiation with laser light.

[Label]

Figure 2:
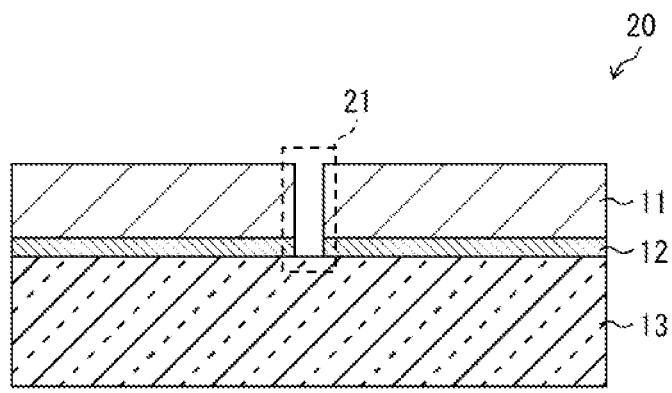
FIG. 2 schematically illustrates an example of a cross-sectional structure of a label in accordance with an embodiment of the present invention.

FIG. 2 schematically illustrates an example of a cross-sectional structure of a label in accordance with an embodiment of the present invention. As illustrated in FIG. 2, a label 20 includes a first layer 11, a second layer 12, a base material layer 13, and a print portion 21. That is, the label 20 includes the foregoing laminate 10 in accordance with the present embodiment and the print portion 21.

The print portion 21 is a portion which has been formed on the laminate 10 by irradiation with short wavelength laser light (described later). For example, the print portion 21 is formed in the following manner: a surface of the first layer 11 is irradiated with laser light while the position to be irradiated with the laser light is moved, and thereby the portion irradiated with the laser light is etched. In the print portion 21, the base material layer 13 is exposed on the side where the first layer 11 is located.

When seen in plan view, the print portion 21 has, on the surface of the first layer 11, a shape that corresponds to the positions irradiated with laser light. The shape of the print portion 21 in plan view is not limited, and examples thereof include characters, symbols, patterns, and combinations thereof. The shape of the print portion 21 in plan view can be selected as appropriated according to the purpose of use of the label 20. Examples of the shape of the print portion 21 in plan view include serial numbers for product management and characters or figures corresponding to information for quality assurance (such as time of production or best-before date).

Whether the print portion 21 has been formed by etching can be determined by, for example, observing the surface profile of the print portion 21. For example, because the surface of the print portion 21 has been formed by irradiation with laser light, the surface has non-uniform fine asperities.

Furthermore, in a case where the first layer 11 or the second layer 12 contains a thermoplastic resin, the surface of the print portion 21 may show a sign of the thermoplastic resin having been melted. As such, by observing the surface of the print portion 21, it is possible to determine whether the print portion 21 has been formed by etching.

[Laser Light]

The label 20 is produced by irradiating the foregoing laminate 10 with laser light from the side where the first layer 11 is located. The laser light can be selected as appropriate, provided that the laser light reaches the second layer 12 when the laminate 10 is irradiated with the laser light from the side where the first layer 11 is located. Examples of a laser that can emit such laser light include $CO_2$ laser, Yb laser, $YVO_4$ laser, Nd:YAG laser, excimer laser, semiconductor laser, diode-pumped solid-state laser, Ar laser, $N_2$/Dye laser, and HeCd laser. Of those listed above, the Yb laser, $YVO_4$ laser, and Nd:YAG laser are called short wavelength laser. The $CO_2$ laser, Yb laser, $YVO_4$ laser, and Nd:YAG laser are preferred from the viewpoint that equipment therefor is generally inexpensive and that such types of laser are relatively easy to handle.

The laser light irradiation can be carried out as appropriate according to the wavelength of the laser, power of the laser, pulse period, and spot diameter. For example, in a case where the power of Yb laser is 13 W, pulse period is 50 Hz, and spot diameter is (line width 70 μm) for example, the speed of scanning of the laser light may be 100 mm/second to 3000 mm/second.

[Action]

A laminate in accordance with the present embodiment is irradiated with laser light from the side where the first layer is located. In the portion irradiated with the laser light, the laser light is absorbed, reflected, and/or scattered at the first layer, while a part of the laser light penetrates the first layer to reach the second layer. The second layer absorbs the received laser light, and emits thermal energy corresponding to the light energy of the laser light. Then, in the portion irradiated with the laser light, the second layer, together with the first layer, is etched, and the base material layer is exposed.

As such, because the second layer that has the property of absorbing laser light is present right beneath the first layer to be etched, laser light irradiation forms a high-definition print portion where the base material layer is exposed. If the second layer contains an organic pigment that has a high photothermal conversion property such as carbon black, etching can be achieved with higher definition.

When the first layer contains a metal oxide, the act of reducing the metal oxide may appear depending on the type of laser light. Therefore, in a case where irradiation with such laser light is carried out, the resin in the first layer is inhibited from decomposing during etching. Furthermore, if titanium oxide is used as the metal oxide, a first layer that has a high L value can be obtained. This makes it possible to further improve the visibility of the print portion.

When the first layer contains a metal, the first layer reflects laser light, and therefore the generation of heat in the first layer during etching is further reduced. Furthermore, if a first layer that contains a metal is employed, in a case of a label that is to be attached to the surface of a product with metallic luster, the label can be made less conspicuous when attached to the product.

When the laminate further includes the third layer, the third layer absorbs incident laser light, and therefore the reflection and scattering of the laser light at the third layer are reduced. Therefore, etching resulting from the reflected or scattered laser light is reduced. This makes it possible to achieve etching with higher definition.

The third layer is visible through the base material layer when the print portion is seen from the side where the first layer is located. Therefore, when the third layer has a visible color difference from the first layer, the visibility of the print portion of the label (described later) is further improved. In particular, when the third layer has a hue that is the same as the second layer, the edges of the print portion will a single hue. This makes it possible to further improve the visibility of the print portion. Furthermore, when the third layer has an adhesive property, a stickable label can be achieved with a very simple layer configuration.

A resin film can be suitably used as the base material layer. With regard to such a resin film, the thickness and physical properties such as flexibility can be adjusted easily. This makes it possible to make the laminate and label usable for even more purposes.

[Variations]

The laminate in accordance with the present embodiment can be disposed on a product directly. For example, the surface of a product on which the label is to be disposed may serve as the base material layer.

The etching may be carried out before or after the laminate is attached to the above product. In a case where etching is carried out after the laminate is attached to the product, a label is produced by irradiating the laminate on the product with laser light directly. In such a case, it is possible to produce a label that corresponds to whether the product is acceptable or not during the inspection of the product.

The release layer may contain the foregoing organic pigment. In such a case, the release layer can also serve as the third layer. With such a configuration of the laminate, it is possible to provide a high-definition label in which the color of a product on which the label is to be disposed is visible through the base material layer.

Aspects of the present invention can also be expressed as follows:

A laminate (10) in accordance with an embodiment of the first invention is a laminate for laser printing, including: a first layer (11) having a property of shielding against laser light; a second layer (12) having a property of absorbing the laser light; and a base material layer (13) which is optically transparent, the first layer, the second layer, and the base material layer, being stacked in the order named. The second layer has a thickness of not more than 15 μm. With this aspect, when the laminate is irradiated with laser light from the side where the first layer is located, the second layer absorbs the energy of the laser light, and is etched together with the first layer right above it. This makes it possible to prevent or reduce the occurrence of printing failure that would result from the deformation or melting of the base material layer resulting from heat.

The second layer may contain an organic pigment that has the property of absorbing the laser light. This aspect is more effective in terms of achieving etching with high definition.

The second layer may contain carbon black. This aspect is more effective in terms of achieving etching with high definition and in terms of improving visibility of a print portion in the label.

The first layer may contain a metal oxide and/or a metal. This aspect makes it possible to improve the design of the label.

The first layer may contain titanium oxide. This aspect makes it possible to improve design.

The laminate in accordance with the present embodiment may further include a third layer which has a property of absorbing laser light and which is disposed such that the first layer, the second layer, the base material layer, and the third layer are stacked in the order named. This aspect is more effective in terms of achieving etching with high definition.

The third layer may further have a visible color difference from the first layer. This aspect is more effective in terms of improving the visibility of a print portion of the label.

The third layer may further have the same hue as the second layer. This aspect is more effective in terms of improving the visibility of a print portion of the label.

The third layer may further have an adhesive property. This aspect is more effective in terms of configuring, with a simpler layer configuration, a laminate or a label to be stickable.

The base material layer may be a resin film. This aspect is more effective in terms of making the laminate usable for more purposes.

A label (20) in accordance with another embodiment of the first invention includes a print portion (21) which has been formed by irradiating the laminate in accordance with the foregoing embodiment of the first invention with laser light. The print portion is a portion in which the base material layer is exposed when seen from a side where the first layer is located. This aspect makes it possible to achieve a label for which the occurrence of failure in printing by laser light irradiation is prevented or reduced.

The following description will discuss an embodiment of the second invention.

Embodiment of the Second Invention

[Overview of Configuration of Laminate]

The following description will discuss an embodiment of the second invention. As illustrated in FIG. 1, a laminate 10 is a laminate for laser printing, and includes a first layer 11, a second layer 12, and a base material layer 13. The laminate 10 is comprised of these layers stacked in the order named. The following description will discuss these layers.

[First Layer]

With regard to the first layer in accordance with the second invention, the matters described in paragraphs 0021 to 0025 and 0029 are the same as those for the first invention.

In the second invention, slurry for preparing the first layer is preferably a resin composition that contains a resin and particles of a metal oxide or a metal, in terms of allowing the first layer to have an appropriate thickness suitable for the purpose of use of the laminate. The first layer is preferably composed of the resin composition.

In the first layer, the resin constitutes a continuous phase, and the particles constitute a dispersed phase. The continuous phase is a resin easily decomposable by heat.

The resin in the first layer is particularly preferably an acrylic resin. This is because, when the acrylic resin is pyrolyzed, the main chain is likely to be broken first and the acrylic resin is unlikely to remain as ash, and therefore printing by laser light is likely to be clear. The acrylic resin in the first layer can be selected as appropriate from acrylic resins for the second layer (described later). In the first layer, the acrylic resin may be the same as or different from that in the second layer.

The first layer may further contain other material(s) other than the foregoing resin and pigment, provided that the effect of the present embodiment is achieved. For example, a resin other than the pigment in the first layer may be the same as the material for the second layer (described later). One type of such other material or two or more types of such other materials may be contained. Examples of such other materials include polyol resins and urethane resins.

The thickness of the first layer is preferably not more than 30 µm, more preferably not more than 20 µm, even more preferably not more than 15 µm, even more preferably not more than 10 µm, from the viewpoint stated in paragraph 0026.

The thickness of the first layer is preferably not more than 20 µm in terms of printability. It is preferable that the thickness be not more than 20 µm in terms of preventing or reducing the deformation of the base material layer that would result from the generation of heat during laser printing.

If the first layer is too thin, there may be cases in which the first layer is not thick enough to hide, from sight from the side where the first layer is located, a layer located below the first layer. In terms of hiding the substrate and achieving printing that is well defined enough by laser light irradiation, the thickness of the first layer is preferably not less than 2 µm, more preferably not less than 5 µm, even more preferably not less than 6 µm, even more preferably not less than 10 µm.

The thickness is preferably not less than 2 µm, more preferably not less than 6 µm, for example, from the viewpoint stated in paragraph 0028.

[Second Layer]

The second layer has the property of absorbing laser light. A known material that has the property of absorbing laser light can be used as a material for the second layer. For example, the second layer contains a resin composition containing a resin and a pigment that has the property of absorbing laser light.

(Resin Composition)

In the second layer, the resin in the resin composition is a continuous phase, whereas the pigment is a dispersed phase. Note that the second layer may further contain other material(s) other than the resin and pigment, provided that the effect of the present embodiment is achieved. On type of such other material or two or more types of such other materials may be contained. Examples of such other materials include leveling agents, anti-foaming agents, and matting agents.

(Resin)

The resin in the second layer contains a resin component that has a structure of a reaction product of an acrylic resin, a polycaprolactone polyol, and a polyisocyanate.

In the second layer, if the amount of structural unit of the polycaprolactone polyol in the resin is too small with respect to the acrylic resin, the adhesion of the second layer to the base material layer may be insufficient. If the amount of the structural unit is too large, the definition of the printing on the laminate may be insufficient. In terms of increasing the adhesion between the second layer and the base material layer, the amount of structural unit of the polycaprolactone polyol in the resin is preferably not less than 25 parts by mass, more preferably not less than 40 parts by mass, with respect to 100 parts by mass of the acrylic resin. In particular, an amount of not less than 40 parts by mass is preferred, in terms of increasing the adhesion to the base material layer made of a transparent resin such as polyethylene terephthalate.

In terms of increasing the adhesion and the printability on the laminate to a sufficient extent, the amount of structural unit of the polycaprolactone polyol in the resin is preferably not more than 200 parts by mass with respect to 100 parts by mass of the acrylic resin.

Note that the composition of the resin component in the second layer can be identified or estimated using a known instrumental analysis such as mass spectrometry, infrared spectrophotometry, or nuclear magnetic resonance spectroscopy.

In a case where the resin component is prepared by a synthesis method described later, the amount of structural unit of the polycaprolactone polyol in the resin is substantially the same as the amount of monomer which is a material for the structural unit in the preparation. Therefore, in a case where the resin component is prepared, the amount of the structural unit may be considered the same as the amount of monomer that is a raw material.

<Acrylic Resin>

The 'acrylic resin' in the second invention is a polymer obtained using a (meth)acrylic acid or a derivative thereof as a monomer, and may be a homopolymer or a copolymer. The term "(meth)acrylic" refers to acrylic and/or methacrylic. The term "(meth)acrylate" refers to acrylate and/or methacrylate. The term "(meth)acrylic monomer" refers to at least one of the following: an acrylic acid, a derivative thereof, a methacrylic acid, and a derivative thereof.

It is preferable that the acrylic resin in the second layer contain hydroxyl group or carboxyl group, in terms of increasing the adhesion of the second layer to the base material layer. It is considered that the adhesion increases for the following reason: a crosslinking reaction takes place among the acrylic resin, the polycaprolactone polyol, and the polyisocyanate in the resin component, resulting in a further increase in the interaction between the second layer and the surface of the base material layer.

The acrylic resin containing hydroxyl group can be obtained by, for example, polymerizing a hydroxyl group-containing (meth)acrylic monomer alone or polymerizing a mixture of a hydroxyl group-containing (meth)acrylic monomer and another (meth)acrylic monomer. Examples of a polymerization method include solution polymerization, bulk polymerization, and emulsion polymerization.

Examples of a hydroxyl group-containing (meth)acrylic monomer include 2-hydroxyethyl (meth)acrylate, 2-hydroxypropyl(meth)acrylate, 3-hydroxypropyl(meth)acrylate, 4-hydroxybutyl(meth)acrylate, 3-methyl-3-hydroxybutyl(meth)acrylate, 1,3-dimethyl-3-hydroxybutyl(meth)acrylate, 2,2,4-trimethyl-3-hydroxypentyl(meth)acrylate, 2-ethyl-3-hydroxyhexyl(meth)acrylate, polypropylene glycol mono(meth)acrylate, polyethylene glycol mono(meth)acrylate, poly(ethylene glycol-propylene glycol) mono (meth)acrylate, and pentaerythritol tri(meth)acrylate. One type of hydroxyl group-containing (meth)acrylic monomer or two or more types of hydroxyl group-containing (meth)acrylic monomers may be used.

Examples of another (meth)acrylic monomer other than the hydroxyl group-containing (meth)acrylic monomer include methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, n-hexyl (meth)acrylate, 2-ethylhexyl (meth)acrylate, octyl (meth)acrylate, cyclohexyl (meth)acrylate, phenyl (meth)acrylate, benzyl (meth)acrylate, phenoxyethyl (meth)acrylate, isobornyl (meth)acrylate, 2-methoxy (meth)acrylate, 2-ethoxy (meth)acrylate, glycidyl (meth)acrylate, and tetrahydrofurfuryl (meth)acrylate. One type of such another (meth)acrylic monomer or two or more types of such another (meth)acrylic monomers may be used.

It is preferable that the carboxyl group-containing (meth) acrylic monomer further contain hydroxyl group in addition to the carboxyl group, in terms of increasing the foregoing interaction. Examples of the carboxyl group-containing (meth)acrylic monomer include (meth)acrylic acid, crotonic acid, maleic anhydride, fumaric acid, itaconic acid, glutaconic acid, and citraconic acid. One of such monomers may be used alone or two or more of them may be used.

The glass transition temperature of the acrylic resin is preferably not lower than 30° C., more preferably not lower than 60° C., in terms of achieving good drying property in a case where the second layer is formed by applying ink. The glass transition temperature of the acrylic resin is preferably not higher than 100° C., in terms of obtaining an easily handleable coating liquid in a case where the second layer is formed by applying ink.

The glass transition temperature of the acrylic resin is determined from the sum of glass transition temperatures of respective polymerized (meth)acrylic monomers according to the mass proportions of such (meth)acrylic monomers constituting the acrylic resin. The glass transition temperature Tg of polymerized acrylic acid is determined using the following equation. In the following equation, $Tg_1$ to $Tg_n$ each represent the glass transition temperature (K) of a corresponding one of (meth) acrylic monomers 1 to n constituting a (meth)acrylic resin. In the following equation, $w_1$ to $w_n$ each represent the ratio of the mass of a corresponding monomer to the total mass of the (meth)acrylic monomers 1 to n. n represents the number of types of (meth)acrylic monomers, and is an integer of 2 or more.

$$\frac{1}{Tg} = \frac{w_1}{Tg_1} + \frac{w_2}{Tg_2} + \frac{w_3}{Tg_3} + \ldots + \frac{w_n}{Tg_n}$$

Note that the glass transition temperature Tg of polymerized acrylic acid is determined using absolute temperature (K), but is expressed in the unit of degrees Celsius (° C.) in the present specification.

The glass transition temperature $Tg_n$ of a polymerized (meth)acrylic monomer is the temperature at the point of inflection on a DSC curve obtained by carrying out measurement using a differential scanning calorimeter (DSC) under the following conditions.
   Differential scanning calorimeter (DSC): EXSTAR6000 (manufactured by Seiko Instruments Inc.)
   Atmosphere: nitrogen gas stream
   Amount of measured sample: 10 mg
   Rate of temperature increase: 10° C./minute The glass transition temperatures of typical polymerized (meth)acrylic monomers are, for example, as follows. Methyl methacrylate: 103° C., n-butyl methacrylate: 21° C., butyl acrylate: −57° C., 2-hydroxyethyl methacrylate: 55° C., 2-hydroxyethyl acrylate: −15° C., acrylic acid: 166° C., methacrylic acid: 185° C.

The weight-average molecular weight (Mw) of the acrylic resin is not limited, and is preferably not less than 5000 and not more than one million. It is preferable that the weight-average molecular weight of the acrylic resin be not less than 5000, in terms of increasing the drying property of a layer composed of ink (ink layer) (second layer) prepared by applying ink. It is preferable that the weight-average molecular weight of the acrylic resin be not more than one million, in terms of obtaining the ink that is easily workable during application. The weight-average molecular weight of the acrylic resin is preferably not more than 100,000 in terms of improving the workability.

Note that, in the second invention, a film made of ink which is not dried may be referred to as "ink layer", and the ink layer which has been temporarily or completely dried may be referred to as "coating film". Temporary drying means, for example, drying by which the ink layer is allowed to solidify to the extent that ink can be applied on the ink layer to form another ink layer.

The weight-average molecular weight of the acrylic resin is measured using gel permeation chromatography (GPC) based on polystyrene standard in accordance with the following (1) to (3).
   (1) An acrylic resin solution is applied to release paper and dried at 100° C. for 2 minutes to obtain a film of the acrylic resin.
   (2) The film of the acrylic resin obtained in the (1) is dissolved in tetrahydrofuran so that the solid content is 0.2 mass %.
   (3) The obtained solution is measured using gel permeation chromatography (GPC) under the following conditions.
   (Conditions)
   GPC: HLC-8220 GPC (manufactured by TOSOH CORPORATION)
   Column: four TSK-GEL GMHXL columns (manufactured by TOSOH CORPORATION)
   Mobile phase solvent: tetrahydrofuran
   Flow rate: 0.6 mL/minute
   Column temperature: 40° C.
   Resin Component>

The resin component contained in the second layer has a structure of a reaction product of an acrylic resin, a polycaprolactone polyol, and a polyisocyanate. The resin component may be, for example, a product of a chemical reaction such as an addition reaction or a condensation reaction of the acrylic resin, polycaprolactone polyol, and polyisocyanate or may be a product of a reaction between other materials or a product of some other reaction which has the same structure as the above-stated product.

The resin component may be a product of a reaction between (i) functional groups which are contained in the acrylic resin and polycaprolactone polyol and which are reactive with isocyanate group and (ii) isocyanate group of the polyisocyanate. Examples of the functional groups include hydroxyl group contained in the acrylic resin, carboxyl group contained in the acrylic resin, and hydroxyl group contained in the polycaprolactone polyol. The resin component may have a structure resulting from a reaction between all the above functional groups and isocyanate group, or may have a structure resulting from a reaction between one of or some of the above functional groups (e.g., mainly hydroxyl group) and the isocyanate group. The configuration of the resin component can be adjusted as appropriate by, for example, preparing the second layer under the conditions in which a reaction takes place between certain one(s) of the functional groups and the isocyanate group.

<<Polycaprolactone Polyol>>

An example of the polycaprolactone polyol is represented by R—[O—((C=O)—R'—O)$_m$—H]$_n$. In this formula, R is a residue derived from a polyhydric alcohol such as ethylene glycol or glycerin. n is the number of hydroxyl groups in the polycaprolactone polyol. m is the number of caprolactone units polymerized. R' is a residue derived from a caprolactone which is ring-open polymerized, and may be a divalent alkylene group. One type of polycaprolactone polyol or two or more types of polycaprolactone polyols may be used.

The number of hydroxyl groups in the polycaprolactone polyol is preferably 2 to 6, more preferably 2 to 4. For example, the number of hydroxyl groups is preferably 3 (triol), in terms of increasing printability on the laminate.

The number-average molecular weight of the polycaprolactone polyol is preferably not less than 1000 and not more than 4000. In terms of increasing the adhesion of the second layer to the base material layer and increasing the interaction between the acrylic resin and the resin component in the second layer, the number-average molecular weight of the polycaprolactone polyol is preferably not less than 1000. In terms of increasing the handleability of ink for forming the second layer, the number-average molecular weight of the polycaprolactone polyol is preferably not more than 4000.

The hydroxyl value of the polycaprolactone polyol is preferably not less than 50 mgKOH/g and not more than 200 mgKOH/g. In terms of attaining the solvent resistance to the extent that the first layer can be applied, the hydroxyl value of the polycaprolactone polyol is preferably not less than 50 mgKOH/g. In terms of increasing the adhesion between the first layer and the second layer, the hydroxyl value of the polycaprolactone polyol is preferably not more than 200 mgKOH/g.

The polycaprolactone polyol can be synthesized or may be a commercial polycaprolactone polyol. The polycaprolactone polyol is obtained by, for example, allowing a polycaprolactone to react with a compound containing a plurality of hydroxyl groups per molecule.

Examples of commercial polycaprolactone polyols include Placcel (Registered trademark) manufactured by Daicel Corporation. Examples of the product number of Placcel include: #205 (number-average molecular weight (Mn) is 530, the number of hydroxyl groups is two, hydroxyl value is 212 KOHmg/g), #208 (Mn is 830, the number of hydroxyl groups is two), #210 (Mn is 1000, the number of hydroxyl groups is two), #212 (Mn is 1250, the number of hydroxyl groups is two), #220 (Mn is 2000, the number of hydroxyl groups is two, hydroxyl value is 56 KOHmg/g), #305 (Mn is 530, the number of hydroxyl groups is three, hydroxyl value is 305 KOHmg/g), #308 (Mn is 850, the number of hydroxyl group is three), #309 (Mn is 900, the number of hydroxyl groups is three). #312 (Mn is 1250, the number of hydroxyl groups is three), #320 (Mn is 2000, the number of hydroxyl groups is three), and #410 (Mn is 1000, the number of hydroxyl groups is four).

Examples of commercial polycaprolactone polyols also include the following products manufactured by Perstorp Japan Co., Ltd.: CAPA2085 (Mn is 830, the number of hydroxyl groups is two), CAPA2100 (Mn is 1000, the number of hydroxyl groups is two), CAPA2121 (Mn is 1250, the number of hydroxyl groups is two), CAPA2125 (Mn is 1250, the number of hydroxyl groups is two), CAPA2200 (Mn is 2000, the number of hydroxyl groups is two), CAPA2201 (Mn is 2000, the number of hydroxyl groups is two), CAPA2205 (Mn is 2000, the number of hydroxyl groups is two), CAPA2209 (Mn is 2000, the number of hydroxyl groups is two), CAPA391 (Mn is 900, the number of hydroxyl groups is three), CAPA3121J (Mn is 1200, the number of hydroxyl groups is three), CAPA3201 (Mn is 2000, the number of hydroxyl groups is three), and CAPA4101 (Mn is 1000, the number of hydroxyl groups is four).

<<Polyisocyanate>>

A polyisocyanate refers to a compound that contains two or more isocyanate groups. One polyisocyanate may be used or two or more polyisocyanates may be used.

Examples of aromatic polyisocyanates include: xylylene diisocyanate (XDI); diphenylmethane diisocyanate (MDI); polymeric MDI such as triphenylmethane triisocyanate; and tolylene diisocyanate (TDI).

Examples of aliphatic or alicyclic isocyanates include: hexamethylene diisocyanate (HDI); heptamethylene diisocyanate, isophorone diisocyanate (IPDI); hydrogenated xylylene diisocyanates (hydrogenated XDI) such as 1,4-cyclohexane bis(methyl isocyanate); and hydrogenated diphenylmethane diisocyanates (hydrogenated MDI) such as 4,4-methylene bis(cyclohexyl isocyanate).

In terms of preventing or reducing the discoloration of the second layer, it is preferable that the polyisocyanate be an aliphatic or alicyclic polyisocyanate.

Examples of the polyisocyanate also include dimers of an isocyanate compound and trimers of an isocyanate compound. Examples of such polyisocyanates include uretdione, isocyanurate, and prepolymers of an isocyanate compound and a polyol resin.

Examples of such polyisocyanates also include adducts of (i) an isocyanate and (ii) a polyhydric alcohol, a urea compound, or the like. Examples of the polyhydric alcohol include propylene glycol (difunctional alcohol), butylene glycol (difunctional alcohol), trimethylolpropane (TMP, trifunctional alcohol), glycerin (trifunctional alcohol), and pentaerythritol (tetrafunctional alcohol).

Examples of the adducts include: adducts of tolylene diisocyanate and a trifunctional alcohol; adducts of isophorone diisocyanate and a difunctional alcohol; and adducts of isophorone diisocyanate and a trifunctional alcohol.

The polyisocyanate may be a commercial polyisocyanate. The polyisocyanate is preferably of an isocyanurate type, not only in terms of increasing the adhesion of the second layer to the base material layer but also in terms of increasing the drying property of the ink layer when preparing the second layer by applying ink. Examples of the isocyanurate type include: DURANATE (Registered trademark) TPA-100 (manufactured by Asahi Kasei Corporation); Coronate (Registered trademark) HX (manufactured by TOSOH CORPORATION); and TAKENATE (Registered trademark) D140N, TAKENATE D131N, TAKENATE D204, and TAKENATE D268 (manufactured by Mitsui Chemicals, Inc.).

The amount of the structural unit of the polyisocyanate in the resin component, in terms of the amount of the isocyanate groups, is preferably not less than 0.5 equivalents and not more than 2.0 equivalents with respect to the hydroxyl groups and carboxyl groups contained in the acrylic resin and the polycaprolactone polyol. In terms of preventing or reducing the swelling of the second layer when preparing another layer by applying ink on the second layer as described earlier, the amount of the structural unit of the polyisocyanate is preferably not less than 0.5 equivalents, more preferably not less than 0.6 equivalents, with respect to the hydroxyl groups of the polycaprolactone polyol. In terms of increasing the drying property of an ink layer when preparing the second layer by applying ink as described earlier, the amount of the structural unit of the polyisocyanate is preferably not more than 2.0 equivalents, more preferably not more than 1.5 equivalents, even more preferably not more than 1.2 equivalents, with respect to the hydroxyl groups of the polycaprolactone polyol.

<<Other Components>>

The resin component in the second layer may further contain other component(s) other than the foregoing compounds or structural units obtained therefrom, provided that the effect of the present embodiment can be achieved. For example, the resin component may further contain a structural unit of some other polyol other than the polycaprolactone polyol, provided that the effect of the present embodiment can be achieved. Examples of such other polyol include polycarbonate polyols and polyether polyols.

The resin composition may further contain a structural unit of a compound that contains a polyvalent functional group reactive with the hydroxyl group of the polyol, other than the polyisocyanate, provided that the effect of the present embodiment is achieved. Examples of such other compound include melamine-based crosslinking agents, benzoguanamine-based crosslinking agents, urea-based crosslinking agents, metal chelate-based crosslinking agents, organosilane-based crosslinking agents, epoxy-based crosslinking agents, and acid anhydride-based crosslinking agents. Examples of the melamine-based crosslinking agents include Nikalac (Registered trademark) MS-11 and Nikalac MS-001 (both manufactured by NIPPON CARBIDE INDUSTRIES CO., INC.), and MYCOAT 715 (manufactured by Cytec Industries Japan LLC., "MYCOAT" is a registered trademark owned by Allnex Japan Inc.).

(Pigment)

The second layer contains a pigment that has the property of absorbing laser light. One pigment may be used, or two or more pigments may be used. With regard to the pigment, the matters described in paragraph 0031 are the same as those for the first invention.

The amount of the pigment in the second layer can be selected as appropriate according to, for example, the type of the pigment, provided that the effect of the present embodiment is achieved. For example, in a case where the pigment is carbon black, the amount of the pigment in the resin composition is preferably not less than 4 mass % and not more than 17 mass % with respect to the total amount of the resin.

In terms of achieving printing with higher definition by laser printing on the laminate, the amount of the carbon black in the resin composition is preferably not less than 4 mass % with respect to the total amount of the resin. Furthermore, in terms of achieving printing with higher definition even when the second layer is thin, the amount of the carbon black in the resin composition is preferably not less than 8 mass %. The amount of the carbon black in the resin composition is preferably not more than 17 mass % with respect to the total amount of the resin, in terms of increasing the adhesion of the second layer to the base material layer and in terms of preventing the base material layer from deforming due to heat conducted from the second layer to the base material layer during laser light irradiation.

Note that, with regard to the second layer, the matters described in paragraphs 0032 and 0038 are the same as those for the first invention.

(Other Materials)

The second layer may further contain other material(s) other than those described above, provided that the effect of the present embodiment is achieved. Examples of such other materials include leveling agents, anti-foaming agents, and matting agent.

[Base Material Layer]

With regard to the base material layer, the matters described in paragraph 0039 are the same as those for the first invention. It is preferable that the hue of the first layer differ from the hue of a substrate, in terms of increasing the contrast of printing against the first layer.

Note that the substrate is a part which contacts the base material layer on the opposite side of the base material layer from the first and second layers. The substrate may be some other layer disposed so as to contact the above opposite side of the base material layer or may be an object to which the laminate is attached with an adhesive layer therebetween.

The laser light absorptance of the base material layer is preferably low, in terms of eliminating or reducing the likelihood that the base material will deform or a through-hole will be made in the base material layer due to heat accumulated in the base material layer because of printing with laser light, as with the case of the first invention. On the other hand, the laser light transmittance of the base material layer is preferably high. When the transmittance is high, the reflection and scattering of laser light from the base material layer toward the second layer can be prevented or reduced, and therefore high transmittance is preferred in terms of achieving laser printing with higher definition. From such a point of view, the laser light transmittance of the base material layer may be 50% or more, as with the case of the first invention. The foregoing optical transparency of the base material layer may be uniform throughout the whole laminate or may differ from one portion to be etched to another.

The shape of the base material layer is not limited. The thickness of the base material layer may be uniform or may differ within the laminate. The base material layer preferably has flexibility in terms of making the laminate usable for more purposes. From such a point of view, the base material layer is preferably a resin film. The thickness of the film is not limited and can be selected as appropriate, for example, in consideration of handleability, provided that the deformation of the base material layer resulting from heat accumulation in the base material layer does not occur during laser printing. From such a point of view, the thickness of the film may be, for example, 25 μm to 300 μm.

Any material that typically has high transparency can be used as a material for the base material layer. Examples of such a material include glass, ester-based resins, polycarbonate resins, acrylic resins, and urethane resins. In particular, it is preferable that the base material layer contain an ester-based resin, in terms of making the laminate usable for more purposes and achieving laser printing with high definition.

The ester-based resin is preferably an aromatic ester-based resin, in terms of preventing or reducing the deformation resulting from heat during laser printing. The aromatic ester-based resin is more preferably a transparent resin in terms of preventing or reducing the deformation resulting from heat during laser light irradiation.

Examples of the aromatic ester-based resin include polyethylene terephthalate, polybutylene terephthalate, polycyclohexylenedimethylene terephthalate, and polyethylene naphthalate. In particular, the aromatic ester-based resin is preferably polyethylene terephthalate from the foregoing point of view.

The base material layer may have been subjected to a treatment to increase the adhesion to an adjacent layer such as the second layer. For example, in a case of a base material layer made of an aromatic ester-based resin, a portion of the surface of the base material layer which portion makes contact with the second layer may have been subjected to a treatment to increase adhesion, such as corona treatment or formation of an easily adhering coating, in order to increase the adhesion to the second layer.

[Other Layers]

The laminate in accordance with the present embodiment may further include some other layer(s) that lies between any of the forgoing layers, provided that the effect of the present embodiment is achieved. Examples of such other layer(s) include an intermediate layer that is disposed between the first layer and the second layer and that has a hue between the hue of the first layer and the hue of the second layer. It is preferable that the intermediate layer be disposed between the first layer and the second layer in terms of increasing the first layer's property of hiding the second layer. Therefore, the intermediate layer is preferred in order to achieve a desired level of contrast of laser printing in the laminate and in terms of achieving desired appearance of the laminate.

Examples of such other layer also include an adhesive layer that is disposed between the first layer and the second layer or between the second layer and the base material layer and that is for an increase in adhesion between the two adjacent layers. The adhesive layer is preferred in terms of increasing the adhesion between layers of the laminate.

The laminate may further include an adhesive layer on the opposite side of the base material layer from the first and second layers, in order to fix the laminate to a desired place. The adhesive layer may have a hue differing from the hue of the first layer, in terms of sufficiently increasing the contrast of the appearance of laser printing. The hue of the adhesive layer can be set as appropriate by dispersing a pigment of a desired color in the adhesive layer.

Examples of such other layer also include a release layer. With regard to the release layer, the matters described in paragraph 0052 are the same as those for the first invention. This is the same as the foregoing first invention.

Similarly to the first layer and the second layer in accordance with the present embodiment, such other layer can also be prepared by: applying ink containing a resin having desired physical properties and a pigment suitable for need; and drying the ink.

[Method of Producing Laminate]

The laminate in accordance with the present embodiment can be produced using a known method of producing a laminate for laser printing. For example, the laminate in accordance with the present embodiment can be produced by a method including: a step of applying a second ink containing a material for a second layer on a base material layer to produce a coating film obtained from the second ink; and a step of applying a first ink containing a material for a first layer on the coating film obtained from the second ink to produce a coating film obtained from the first ink.

The second ink is a composition containing materials for the resin composition discussed with regard to the second layer. For example, the second ink is a liquid composition containing an acrylic resin, a polycaprolactone polyol, a polyisocyanate, and carbon black in amounts which have been described earlier. The coating film obtained from the second ink is prepared by drying a layer of the second ink.

The first ink is a composition of materials described earlier with regard to the first layer. The first ink may be the same as the materials for the second ink, except for a pigment. For example, the first ink is a liquid composition containing an acrylic resin, a polycaprolactone polyol, a polyisocyanate, and titanium oxide in amounts which have been described earlier. The coating film obtained from the first ink is prepared by drying a layer of the first ink.

The first ink or the second ink can be applied using a known technique. For example, the ink can be applied by screen printing, gravure printing, bar coating, knife coating, roll coating, comma roll coating, blade coating, die coating, spray coating, electrostatic coating, or dip coating.

The coating film obtained from the first ink or the coating film obtained from the second ink can be prepared using a known technique. For example, the coating film can be prepared by drying the ink layer by drying with hot air or heating with a heating apparatus such as an oven or a hot plate.

The production method may further include other step(s), provided that the effect of the present embodiment is achieved. For example, the production method may further include a step of curing (i) the layer of the second ink or the coating film obtained from the second ink and (ii) the layer of the first ink or the coating film obtained from the first ink.

The step of curing the ink layer or the coating film is not limited, provided that the following environment is maintained for a sufficient period of time: an environment in which the temperature is sufficient for urethane bonds, which bind the acrylic resin and the polycaprolactone polyol with the polyisocyanate, to form in the ink layer and the coating film. For example, the step of curing can be carried out by drying with hot air or heating with a heating apparatus such as an oven or a hot plate. In a case where the step of curing is included, the coating film obtained from the second ink, before the first ink is applied, need only be dried to the extent that the first ink can be applied. The step of curing makes it possible to prepare the coating film obtained from the first ink and the coating film obtained from the second ink concurrently. The step of curing is therefore preferred in terms of saving labor in the production of the laminate.

The production method may further include a step of subjecting a surface of the base material layer to a treatment to increase the adhesion to a coating film obtained from ink. The treatment is, for example, the foregoing corona treatment and/or treatment to produce an easily adhering coating.

The production method may further include a step of disposing a release layer on the opposite side of the base material layer from the second layer with an adhesive layer therebetween. The adhesive layer may be prepared on the surface of the release layer or may be prepared on the opposite surface of the base material layer from the second layer. When the prepared adhesive layer and the base material layer or the release layer are bonded together, the release layer is disposed on the opposite side of the base material layer from the second layer with the adhesive layer therebetween.

In the production method, the adhesive layer between the release layer and the base material layer may be an adhesive layer that has a hue differing from the hue of the first layer. For example, the adhesive layer that has a hue differing from the hue of the first layer can be prepared by preparing a coating film by applying, on the base material layer or the release layer, a coating liquid containing an adhesive resin composition and a black pigment (e.g., carbon black).

[Laser Light]

With regard to laser light with which the laminate is irradiated for laser printing, the matters described in paragraphs 0067 and 0068 are the same as those for the first invention.

[Action]

FIG. 2 schematically illustrates the laminate 10 shown in FIG. 1 which has been etched with laser light. For example, when a certain position of the first layer 11 is irradiated with laser light, the first layer 11 reflects and absorbs the laser light, but transmits a part of the laser light. The part of the incident laser light therefore reaches the second layer 12, and is absorbed by the second layer 12. Therefore, the second layer 12 generates heat, and the acrylic resin of the second layer 12 decomposes from the generated heat.

As the acrylic resin in the second layer 12 decomposes, a gas is generated in the second layer 12. The generation of the gas blows the second layer 12 and the first layer 11 right above the second layer 12 away in the area irradiated with the laser light. As such, as illustrated in FIG. 2, a print portion 21, which is a hole in a very narrow area irradiated with laser light, is formed and the base material layer 13 is exposed. The second layer 12 has an appropriate level of adhesion to the base material layer 13; therefore, only a very narrow area of the second layer 12 irradiated with laser light is blown away, and its surrounding area is not etched. This achieves etching with high definition.

As such, in the laminate in accordance with the present embodiment, the second layer contains a resin component that has a structure of a reaction product of an acrylic resin, a polycaprolactone polyol, and a polyisocyanate. The acrylic resin is pyrolyzed by laser light irradiation and, during pyrolysis, the main chain is broken and therefore the acrylic resin is unlikely to remain as ash. Therefore, the laminate is suitable for laser printing with high definition. Furthermore, the second layer has a structure resulting from a reaction between (i) the acrylic resin and polyol resin and (ii) the polyisocyanate. This achieves an appropriate level of adhesion of the second layer to an adjacent layer. Therefore, in an area irradiated with laser light, the second layer is blown away from the base material layer, whereas, in the other areas, the adhesion of the second layer to the base material layer is achieved sufficiently.

As such, the acrylic resin, which is appropriately likely to be broken by laser light irradiation, and the resin component that can achieve an appropriate level of adhesion, are contained. This achieves etching with high definition. Furthermore, in the laminate in accordance with the present embodiment, the second layer need only be disposed to have a thickness to the extent that the second layer can be etched via the foregoing mechanism, that is, the second layer is sufficiently blown away by heat resulting from laser irradiation. Therefore, in the laminate in accordance with the present embodiment, the thickness of the second layer, which has the property of absorbing laser light, can be made thinner than those of the conventional laminates for laser printing. Therefore, the amount of heat stored in the second layer due to laser light irradiation during laser printing is smaller than the conventional laminates, and the amount of heat transmitted from the second layer to the base material layer is smaller than the conventional laminates. Therefore, the deformation of the base material layer resulting from heat is reduced as compared to the conventional laminates, and the deformation of a printed character etc. resulting from the deformation of the base material layer does not occur. This makes it possible to achieve printing with higher definition by laser printing.

Figure 3:
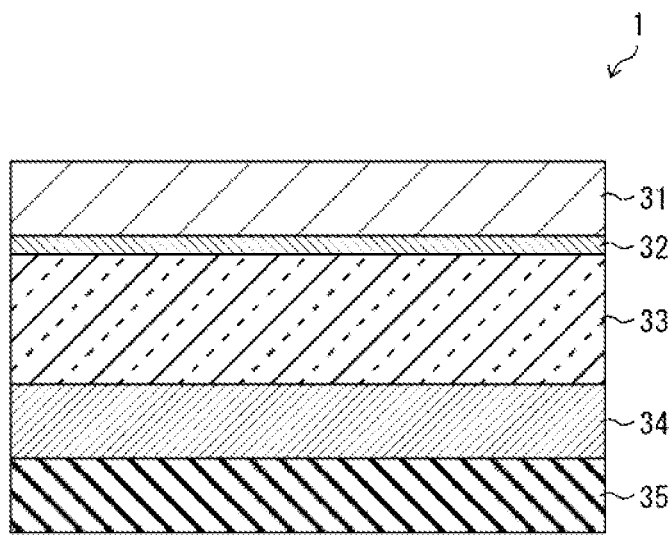
FIG. 3 schematically illustrates an example of a cross-sectional structure of a laminate in accordance with another embodiment of the present invention.
Figure 4:
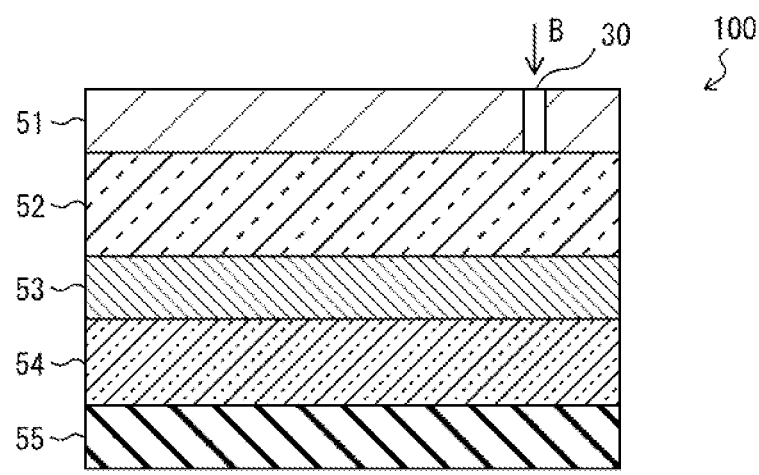
FIG. 4 schematically illustrates an example of a layer configuration of a conventional laminate for laser printing.

The laminate in accordance with the present embodiment may further include other layer(s), as described earlier. FIG. 3 schematically illustrates an example of a layer configuration of a laminate 1 in accordance with another embodiment of the present invention. A laminate 1 has the same configuration as the laminate 10 shown in FIG. 1, except that the laminate 1 further includes third layers, which are the foregoing other layers, in addition to a first layer 31, a second layer 32, and a base material layer 33. The third layers may be, for example, an adhesive layer 34 and a release layer 35, each of which can be composed of known material(s). The adhesive layer 34 can be composed of, for example, a coating film obtained from a liquid composition (coating liquid) that contains an acrylic pressure sensitive adhesive. The release layer 35 may be, for example, release paper.

With regard to the laminate 1, when the base material layer 33 is exposed by etching, the hue (e.g., black) of the adhesive layer 34, corresponding to the substrate of the laminate 1, is seen in the print portion. This further improves the visibility of the print portion formed by scanning of laser light. Furthermore, by removing the release layer 35, it is possible to attach the laminate 1 (label), which has printed characters etc. whose visibility has been improved as described above, to a desired position with the adhesive layer 34 therebetween.

Aspects of the second invention can also be expressed as follows:

A laminate in accordance with an embodiment of the second invention is a laminate for laser printing, including: a first layer (11) having a property of shielding against laser light; a second layer (12) having a property of absorbing the laser light; and a base material layer (13) which is optically transparent, the first layer, the second layer, and the base material layer being stacked in the order named. The second layer contains a resin composition that contains a resin and a pigment that has a property of absorbing the laser light, and the resin contains a resin component that has a structure of a reaction product of an acrylic resin, a polycaprolactone polyol, and a polyisocyanate. Since the laminate of the present embodiment includes the second layer, it is possible to carry out laser printing with high definition.

In the present embodiment, the resin may contain structural unit of the polycaprolactone polyol in an amount of not less than 40 parts by mass and not more than 200 parts by mass with respect to 100 parts by mass of the acrylic resin. This configuration is more effective in terms of improving the adhesion of the second layer to the base material layer.

In the present embodiment, the polycaprolactone polyol may have a number-average molecular weight of not less than 1000 and not more than 4000. This configuration is more effective in terms of improving workability during an operation of using ink when the second layer is formed from the ink.

In the present embodiment, the polycaprolactone polyol may have a hydroxyl value of not less than 50 mgKOH/g and not more than 200 mgKOH/g. This configuration is more effective in terms of improving the adhesion between the first layer and the second layer.

In the present embodiment, the acrylic resin may have a glass transition temperature of not lower than 30° C. and not higher than 100° C. This configuration is more effective in terms of improving the handleability and drying property of ink when the second layer is formed from the ink.

In the second layer of the present embodiment, the pigment may be carbon black, and the amount of the pigment contained in the resin composition may be not less than 4 mass % and not more than 17 mass % with respect to the total amount of the resin. This configuration is more effective in terms of achieving laser printing with high definition and in terms of improving the adhesion of the second layer to the base material layer.

The present embodiment may be configured such that the resin component contains not less than 0.5 equivalents and not more than 2.0 equivalents of isocyanate groups with respect to the hydroxyl groups and the carboxyl groups contained in the acrylic resin and the polycaprolactone polyol. This configuration is more effective in terms of preventing or reducing the swelling of the second layer and improving the drying property of the second layer when forming the second layer from ink.

The present embodiment may be configured such that the base material layer contains an ester-based resin. This configuration is more effective in terms of making the laminate useful for more purposes and in terms of achieving laser printing with high definition.

The present embodiment may be configured such that the ester-based resin is an aromatic ester-based resin. This configuration is more effective in terms of preventing or reducing the deformation of the base material layer that would result from heat during laser light irradiation. The present embodiment may be configured such that the aromatic ester-based resin is polyethylene terephthalate. This configuration is more effective from the above point of view.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

Examples of the First Invention

Preparation Example 1 of Black Ink

The following components in the following amounts were mixed together, and diluted with ethyl acetate so that the solid content would be 30 mass %. In this way, a black ink K1 was prepared.
Nikkalite H4007K4: 50.0 parts by mass
Placcel 320: 50.0 parts by mass
TAKENATE D-131N: 30.8 parts by mass
CAB381-0.1: 3.2 parts by mass
Pigment NX-591 black: 36.6 parts by mass The "Nikkalite H4007K4" is an acrylic resin manufactured by NIPPON CARBIDE INDUSTRIES CO., INC. The glass transition temperature of the "Nikkalite H4007K4" is 71° C., and the weight-average molecular weight of the "Nikkalite H4007K4" is 8000. The "Nikkalite" is a registered trademark owned by NIPPON CARBIDE INDUSTRIES CO., INC.

The "Placcel 320" is a polycaprolactone polyol manufactured by Daicel Corporation. The hydroxyl value of the "Placcel 320" is 85 mgKOH/g, and the number-average molecular weight of the "Placcel 320" is 2000. The "Placcel" is a registered trademark owned by Daicel Corporation.

The "TAKENATE D-131N" is an isocyanate crosslinking agent manufactured by Mitsui Chemicals, Inc. The "TAKENATE" is a registered trademark owned by Mitsui Chemicals, Inc.

The "CAB381-0.1" is cellulose acetate butyrate manufactured by Eastman Chemical Company.

The "NX-591 black" is a black color base manufactured by Dainichiseika Color & Chemicals Mfg. Co., Ltd. The carbon black content of the "NX-591 black" is 43.9 mass %.

Preparation Example 2 of Black Ink

The same operations as described in Preparation Example 1 of black ink were carried out, except that the amount of the "NX-591 black" was changed to 18.3 parts by mass. In this way, a black ink K2 was prepared.

Preparation Example 3 of Black Ink

The same operations as described in Preparation Example 1 of black ink were carried out, except that the amount of the "NX-591 black" was changed to 73.2 parts by mass. In this way, a black ink K3 was prepared.

Preparation Example 4 of Black Ink

The following components in the following amounts were mixed together to prepare an acrylic base liquid.
Nikkalite H-4002: 100 parts by mass
POLYFLOW No. 85HF: 2.0 parts by mass
FZ-2110: 0.16 parts by mass
TINUVIN 327: 2.05 parts by mass The "Nikkalite H-4002" is an acrylic resin manufactured by NIPPON CARBIDE INDUSTRIES CO., INC. The glass transition temperature of the "Nikkalite H-4002" is 38° C., and the weight-average molecular weight of the "Nikkalite H-4002 is 8000.

The "POLYFLOW No. 85HF" is an acrylic-based leveling agent manufactured by KYOEISHA CHEMICAL CO., LTD.

The "FZ-2110" is a silicone-based anti-foaming agent manufactured by Toray Dow Corning Co., Ltd.

The "TINUVIN 327" is a benzotriazole-based ultraviolet absorbing agent manufactured by BASF. The "TINUVIN" is a registered trademark owned by BASF.

The following components in the following amounts were mixed into 100 parts by mass of the acrylic base liquid to prepare a black ink K4.
NX-591 black: 21.7 parts by mass
Coronate HK: 25.7 parts by mass The "Coronate HK" is a non-yellowing polyisocyanate manufactured by TOSOH CORPORATION. The "Coronate" is a registered trademark owned by TOSOH CORPORATION.

Preparation Example 5 of Black Ink (Coating Liquid)

The following components in the following amounts were mixed together, and diluted with ethyl acetate so that the solid content would be 35 mass %. In this way, an ink K5, which is a black coating liquid, was prepared. Note that the coating liquid is an ink containing a coloring pigment and an adhesive, and is a liquid material for forming an adhesive colored layer.
Nissetsu KP-982: 100.0 parts by mass
Coronate L-45E: 3.3 parts by mass
NX-591 black: 32.0 parts by mass The "Nissetsu KP-982" is an acrylic pressure sensitive adhesive manufactured by NIPPON CARBIDE INDUSTRIES CO., INC. The "Nissetsu" is a registered trademark owned by NIPPON CARBIDE INDUSTRIES CO., INC.

The "Coronate L-45E" is an isocyanate crosslinking agent manufactured by TOSOH CORPORATION.

Preparation Example 1 of White Ink

The following components in the following amounts were mixed together, and diluted with ethyl acetate so that the solid content would be 30 mass %. In this way, a white ink W1 was prepared.

Nikkalite H4007K4: 80.0 parts by mass
Placcel 305: 20.0 parts by mass
TAKENATE D-131N: 46.5 parts by mass
CAB381-0.1: 3.7 parts by mass
NBK-967 white: 82.1 parts by mass The "Placcel 305" is a polycaprolactone polyol manufactured by Daicel Corporation. The hydroxyl value of the "Placcel 305" is 305 mgKOH/g, and the number-average molecular weight of the "Placcel 305" is 500.

The "NBK-967 white" is a white color base containing titanium oxide, manufactured by NIKKO BICS CO., LTD.

Preparation Example 2 of White Ink

The following components in the following amounts were mixed into 100 parts by mass of the acrylic base liquid in Preparation Example 4 of black ink to prepare a white ink W2.
NX-501 white: 282 parts by mass
Coronate HK: 25 parts by mass The "NX-501 white" is an acrylic-based white color base manufactured by Dainichiseika Color & Chemicals Mfg. Co., Ltd. The titanium oxide content of the "NX-501 white" is 58 mass %.

Preparation Example 3 of White Ink (Coating Liquid)

The same operations as described in Preparation Example 5 of black ink were carried out, except that 29 parts by mass of NBK-967 white was used instead of 32 parts by mass of NX-591 black. In this way, an ink W3, which is a white coating liquid, was prepared.

Example 1

The ink K1 was applied to one surface of "COSMOSHINE A4300" (which is a 50 μm-thick PET film having easily adhering surfaces on both sides, manufactured by TOYO BOSEKI CO., LTD.) ("COSMOSHINE" is a registered trademark owned by TOYO BOSEKI CO., LTD.) so that the thickness of a dried film would be 1 μm, and dried at 150° C. for 1 minute. In this way, a coating film obtained from the ink K1 was formed.

Next, the ink W1 was applied to the coating film obtained from the ink K1 so that the thickness of a dried film would be 15 μm, and dried at 150° C. for 3 minutes. In this way, a coating film obtained from the ink W1 was formed. Next, the PET film having thereon the coating films obtained from the ink K1 and B was cured at 60° C. for 3 days. In this way, a coated film 1-1 including the PET film, the coating film obtained from the ink K1, and the coating film obtained from the ink W1 which are stacked in the order named was obtained.

Next, the ink K5 was applied to a surface of release paper (EK-B manufactured by LINTEC Corporation) so that the thickness of a dried film would be 20 μm, and dried at 100° C. for 1 minute. In this way, a coating film obtained from the ink K5 was formed on the release paper. Next, the coated film 1-1 was disposed on the coating film obtained from the ink K5, thereby bringing the coating film obtained from the ink K5 and the PET film into close contact to each other. In this way, a laminate 1-1 for laser printing as shown in FIG. 3 was produced. The laminate 1-1 includes: the coating film obtained from the ink W1 (corresponding to the first layer 31); the coating film obtained from the ink K1 (corresponding to the second layer 32); the PET film (corresponding to the base material layer 33); the coating film obtained from the ink K5 (corresponding to the adhesive layer 34 serving as a third layer); and the release paper (corresponding to the release layer 35), which are stacked in the order named.

Example 2

The same operations as described in Example 1 were carried out, except that the ink K1 was applied so that the thickness of a dried film would be 2 μm. In this way, a laminate 1-2 was produced.

Example 3

The same operations as described in Example 2 were carried out, except that the ink K2 was used instead of the ink K1. In this way, a laminate 1-3 was produced.

Example 4

The same operations as described in Example 2 were carried out, except that the ink K5 was applied so that the thickness of a dried film would be 10 μm. In this way, a laminate 1-4 was produced.

Example 5

The same operations as described in Example 2 were carried out, except that the ink K5 was applied so that the thickness of a dried film would be 2 μm. In this way, a laminate 1-5 was produced.

Reference Example 6

The same operations as described in Example 2 were carried out, except that the ink W3 was used instead of the ink K5. In this way, a laminate 1-6 was produced.

Example 7

The same operations as described in Example 1 were carried out, except that the ink K1 was applied so that the thickness of a dried film would be 6 μm. In this way, a laminate 1-7 was produced.

Example 8

The same operations as described in Example 7 were carried out, except that the ink K3 was used instead of the ink K1 and that the ink W1 was applied so that the thickness of a dried film would be 8 μm. In this way, a laminate 1-8 was produced.

Example 9

The same operations as described in Example 1 were carried out, except that the ink K1 was applied so that the thickness of a dried film would be 8 μm. In this way, a laminate 1-9 was produced.

Example 10

The same operations as described in Example 1 were carried out, except that the ink K1 was applied so that the thickness of a dried film would be 10 μm. In this way, a laminate 1-10 was produced.

Example 11

The same operations as described in Example 1 were carried out, except that the ink K1 was applied so that the thickness of a dried film would be 15 μm. In this way, a laminate 1-11 was produced.

Comparative Example 1

A PET film (COSMOSHINE A4300) was treated to have easily adhering surfaces on both sides. Next, the ink K4 was applied to one surface of the PET film so that the thickness of a dried layer would be 30 μm, and dried at 90° C. for 10 minutes. In this way, a black layer was formed on that one surface of the PET film.

Next, the ink W2 was applied to the opposite surface of the PET film so that the thickness of a dried layer would be 30 μm, and dried at 90° C. for 10 minutes. In this way, a white layer was formed on that opposite surface of the PET film. In this way, a coated film including the black layer, the PET film, and the white layer stacked in the order named was produced.

Next, an adhesive solution having the following composition was applied to a surface of the black layer of the coated film so that the thickness of a dried layer would be 40 μm, and dried at 90° C. for 5 minutes. In this way, an adhesion layer was formed on the black layer. The "Coronate L" is an isocyanate crosslinking agent manufactured by TOSOH CORPORATION.

Nissetsu KP-982 100.0 parts by mass
Coronate L 2.4 parts by mass

Next, release paper was disposed on and brought into close contact with the adhesion layer such that a surface having a releasing property faced the adhesion layer. In this way, a laminate 1-C1 was produced. The laminate 1-C1 includes: the white layer (corresponding to a first layer); the PET film (corresponding to a base material layer); the black layer (corresponding to a third layer); the adhesion layer; and the release paper.

Comparative Example 2

The same operations as described in Comparative Example 1 were carried out, except that a 75 μm-thick transparent acrylic film "ACRYPLEN HBL002" (manufactured by Mitsubishi Chemical Corporation, the "ACRYPLEN" is a registered trademark owned by Mitsubishi Chemical Corporation) was used instead of the PET film, and that the thickness of each of the black and white layers was changed to 13 μm. In this way, a laminate 1-C2 was produced.

Comparative Example 3

The ink K4 was applied to one surface of the PET film in Comparative Example 1 so that the thickness of a dried layer would be 30 μm, and dried at 90° C. for 10 minutes. In this way, a black layer was formed on that one surface of the PET film.

Next, the ink W2 was applied to the black layer so that the thickness of a dried film would be 30 μm, and dried at 90° C. for 10 minutes. In this way, a coated film including the PET film, the black layer, and the white layer stacked in the order named was produced.

In the same manner as described in Comparative Example 1, an adhesion layer was formed on a surface of the PET film of the coated film, and release paper was brought into close contact with the adhesion layer. In this way, a laminate 1-C3 was produced. The laminate 1-C3 includes: the white layer (corresponding to a first layer); the black layer (corresponding to a second layer); the PET film (corresponding to a base material layer); the adhesion layer; and the release paper, which are stacked in the order named.

Comparative Example 41

The ink W1 was applied to one surface of a PET film "Lumirror X30" so that the thickness of a dried film would be 15 μm, and dried at 150° C. for 3 minutes. The "Lumirror X30" is a black PET film manufactured by TORAY INDUSTRIES, INC. The "Lumirror" is a registered trademark owned by TORAY INDUSTRIES, INC. Next, the black PET film having the coating film obtained from the ink W1 was cured at 60° C. for 3 days. In this way, a coated film was produced.

Next, a coating film obtained from the ink K5 and release paper were stacked in the same manner as described in Example 1, except that the coated film in Comparative Example 4 was used instead of the coated film 1. In this way, a laminate 1-C4 was produced. The laminate 1-C4 includes: the coating film obtained from the ink W1 (corresponding to a first layer); the black PET film (substituting for a base material layer); the coating film obtained from the ink K5 (corresponding to a third layer); and the release paper, which are stacked in the order named.

[Evaluation]

The laminates 1-1 to 1-11 and the laminates 1-C1 to 1-C4 were each subjected to the following evaluations.

(1) Printability with respect to short wavelength laser (Yb laser) With use of a FAYb laser marker LP-Z130 (manufactured by Panasonic Corporation), the first layer of each laminate was irradiated with Nd:YAG laser light (hereinafter may be referred to as "short wavelength laser") under the conditions in which the power level was 20%, pulse period was 50 Hz, line width was 0.07 mm, and 1000 mm/second, and thereby a set of characters "NIPPON CARBIDE INDUSTRIES CO., INC." having a height of 3.5 mm and a width of 2.0 mm and a two-dimensional code measuring 10 mm×10 mm were printed. Then, the printed two-dimensional code was read with a two-dimensional code reader (product name: SR-H60W, manufactured by KEYENCE CORPORATION) or visually, and the printability on the laminate with respect to short wavelength laser light was evaluated on the basis of the following criteria. It can be said that a laminate evaluated as "A" or "B" is acceptable for practical use.

A: It was possible to read the characters and the two-dimensional code both with the two-dimensional code reader and visually. In addition, the edges of the printed characters were well defined.

B: It was possible to read the characters and the two-dimensional code both with the two-dimensional code reader and visually; however, the edges of the printed characters were somewhat non-smooth.

C: It was possible to read the characters visually, but not possible to read the two-dimensional code with the two-dimensional code reader.

D: It was not possible to read the two-dimensional code with the two-dimensional code reader, and it was also difficult to read the characters visually.

(2) Printability with Respect to $CO_2$ Laser

With use of a $CO_2$ laser marker ML-Z9510 (manufactured by KEYENCE CORPORATION), the first layer of each laminate was irradiated with $CO_2$ laser light under the conditions in which the line width was 0.07 mm, power level was 85%, and 860 mm/second, and thereby two-dimensional codes having two different sizes, i.e., a two-dimensional code measuring 10 mm×10 mm and a two-dimensional code measuring 6 mm×6 mm, were printed. Then, the printed two-dimensional codes were read using the foregoing two-dimensional code reader, and the printability on the laminate with respect to $CO_2$ laser light was evaluated on the basis of the following criteria.

A: It was possible to read both the two-dimensional code measuring 10 mm×10 mm and the two-dimensional code measuring 6 mm×6 mm, with the two-dimensional code reader.

B: It was possible to read the two-dimensional code measuring 10 mm×10 mm with the two-dimensional code reader, but it was not possible to read the two-dimensional code measuring 6 mm×6 mm with the two-dimensional code reader.

C: It was possible to read neither the two-dimensional code measuring 10 mm×10 mm nor the two-dimensional code measuring 6 mm×6 mm, with the two-dimensional code reader.

(3) Adhesion

The adhesion of the first layer in each laminate was evaluated in accordance with the method stated in JIS K5600-5-6. Specifically, eleven vertical and eleven horizontal cuts, along two directions orthogonal to each other in a plane parallel to the first layer, were made in the first layer at 1 mm intervals so as not to cut the layers or films beneath the first layer. In this way, cuts in the form of a grid were made in the first layer of the laminate.

Next, a piece of CELLOTAPE CT-24 manufactured by NICHIBAN Co., Ltd. (width: 24 mm, "CELLOTAPE" is a registered trademark owned by NICHIBAN Co., Ltd.) was put on the part with the cuts in the form of a grid with use of a squeegee so that no air would be trapped. Then, the surface of the CELLOTAPE thus put was strongly rubbed by human power ten times with use of the squeegee.

Next, the CELLOTAPE was removed quickly in a direction at an angle of 90° to (orthogonal to) the plane parallel to the part with the cuts in the form of a grid. Next, whether or not the first layer peeled off in the part with the cuts in the form of a grid was visually checked.

Next, with regard to each laminate for which the first layer was found not to have peeled off, the first layer of the laminate was irradiated with short wavelength laser light in the foregoing manner after the above adhesion test, and thereby a two-dimensional code measuring 10 mm×10 mm was printed. Then, a piece of CELLOTAPE was put on the portion where the two-dimensional code was printed, and the adhesion test (CELLOTAPE was put, pressed/rubbed, and removed) was carried out in the same manner as described above.

The result of the adhesion test as described above was visually checked, and the adhesion of the first layer in the laminate was evaluated on the basis of the following criteria. It can be said that a laminate evaluated as "A" or "B" is acceptable for practical use.

A: The first layer was found to have not peeled off in the part with the cuts in the form of a grid or the part with the two-dimensional code, and it was possible to read the two-dimensional code after the adhesion test with the two-dimensional code reader.

B: The first layer was found to have not peeled off in the adhesion test on the part with the cuts in the form of a grid, but was found to have somewhat peeled off in the adhesion test on the part with the two-dimensional code. However, it was possible to read the two-dimensional code after the adhesion test with the two-dimensional code reader.

C: The first layer was found to have not peeled off in the adhesion test on the part with the cuts in the form of a grid, but was found to have peeled off in the adhesion test on the part with the two-dimensional code. It was not possible to read the two-dimensional code after the adhesion test with the two-dimensional code reader.

D: The first layer was found to have peeled off in the adhesion test on the part with the cuts in the form of a grid.

The layer configurations of the laminates 1-1 to 1-11 and the laminates 1-C1 to 1-C4 and the results of evaluation are shown in Table 1.

TABLE 1

| | Layer configuration | | | | | | Results of evaluation | | |
|---|---|---|---|---|---|---|---|---|---|
| | First layer | | Second layer | | Third layer | | Laser printability | | |
| Laminate No. | Type of ink | Thickness (μm) | Type of ink | Thickness (μm) | Type of ink | Thickness (μm) | Short-wavelength laser | $CO_2$ Laser | Adhesion |
| 1-1 | W1 | 15 | K1 | 1 | K5 | 20 | A | A | A |
| 1-2 | W1 | 15 | K1 | 2 | K5 | 20 | A | A | A |
| 1-3 | W1 | 15 | K2 | 2 | K5 | 20 | A | A | A |
| 1-4 | W1 | 15 | K1 | 2 | K5 | 10 | A | A | B |
| 1-5 | W1 | 15 | K1 | 2 | K5 | 2 | B | A | B |
| 1-6 | W1 | 15 | K1 | 2 | W3 | 20 | B | A | B |
| 1-7 | W1 | 15 | K1 | 6 | K5 | 20 | A | A | A |
| 1-8 | W1 | 8 | K3 | 6 | K5 | 20 | A | A | A |
| 1-9 | W1 | 15 | K1 | 8 | K5 | 20 | A | A | A |
| 1-10 | W1 | 15 | K1 | 10 | K5 | 20 | A | A | B |
| 1-11 | W1 | 15 | K1 | 15 | K5 | 20 | A | A | B |
| 1-C1 | W2 | 30 | — | — | K4 | 30 | D | A | C |
| 1-C2 | W2 | 13 | — | — | K4 | 13 | D | A | A |
| 1-C3 | W2 | 30 | K4 | 30 | — | — | B | C | C |
| 1-C4 | W1 | 15 | — | — | K5 | 20 | C | C | A |

[Discussion]

The laminates 1-1 to 1-11 each have a sufficient level of printability acceptable for practical use, with respect to both the short wavelength laser light and the $CO_2$ laser light. Furthermore, the laminates 1-1 to 1-11 each have a sufficient level of adhesion of the first layer acceptable for practical use. Reasons therefor are inferred to be as follows. That is, the reason is inferred to be that each of the laminates includes a third layer, a transparent PET film as a base material layer, a second layer, and a first layer which are stacked in the order named. Another reason is inferred to be that, since the second layer of each of the laminates is relatively thin, the accuracy of the thickness of the first layer is high and printing failure resulting from variations in the thickness of the first layer substantially did not occur.

The laminates 1-C1 to 1-C4 do not show a sufficient level of printability with respect to the short wavelength laser light or the C02 laser light. The laminate 1-C1 does not show a sufficient level of printability with respect to the short wavelength laser light and does not show a sufficient level of adhesion. A reason therefor is inferred to be that, although the short wavelength laser light is not enough to sufficiently etch the first layer, the short wavelength laser light allows the resin component to partially decompose and issue a gas, which causes peeling of the first layer from the base material layer (transparent PET film).

The laminate 1-C2 does not show a sufficient level of printability with respect to the short wavelength laser light. A reason therefor is inferred to be that the short wavelength laser light is not enough to sufficiently blow away the first layer.

The laminate 1-C3 does not show a sufficient level of printability with respect to the $CO_2$ laser light and does not show a sufficient level of adhesion. A reason therefor is inferred to be that, since the second layer is too thick, the accuracy of the thickness of the first layer is insufficient and printing failure resulting from variations in the thickness of the first layer occurred. Another reason is inferred to be that, because the second layer was too thick, larger thermal energy was generated in the second layer during etching and the base material layer (PET film) deformed.

The laminate 1-C4 does not show a sufficient level of printability with respect to the short wavelength laser light and does not show a sufficient level of printability with respect to the $CO_2$ laser light. A reason therefor is inferred to be that the black PET film, corresponding to a base material layer, deformed from heat generated due to laser light irradiation.

Examples of the Second Invention

[Preparation of Materials]
[Acrylic Resin]

Acrylic resins 1 to 3 were prepared. The acrylic resin 1 is Nikkalite H4007K4. The acrylic resin 2 is Nissetsu SY-7674. The acrylic resin 3 is Nikkalite H4002. The acrylic resins 1 to 3 are all products from NIPPON CARBIDE INDUSTRIES CO., INC., and the "Nikkalite" and "Nissetsu" are both registered trademarks owned by NIPPON CARBIDE INDUSTRIES CO., INC. The acrylic resins 1 to 3 are each a copolymer of acrylic-based monomers.

With regard to each of the acrylic resins 1 to 3, the composition of monomer units, glass transition temperature Tg, weight-average molecular weight Mw, and solid content are shown in Table 2. In Table 2, the "EA" represents ethyl acrylate, the "MMA" represents methyl methacrylate, the "nBMA" represents n-butyl methacrylate, the "BA" represents butyl acrylate, the "2HEA" represents 2-hydroxyethyl acrylate, the "2HEMA" represents 2-hydroxyethyl methacrylate, and the "AA" represents acrylic acid.

TABLE 2

| | | Acrylic resin No. | | |
|---|---|---|---|---|
| | | 1 | 2 | 3 |
| Product name | | Nikkalite H4007K4 | Nissetsu SY-7674 | Nikkalite H4002 |
| Monomer composition [mass %] | EA | — | 73.5 | — |
| | MMA | 81.5 | 21.5 | 39.8 |
| | nBMA | — | — | 33.3 |
| | BA | 5 | — | 13.4 |
| | 2HEA | 12.5 | — | — |
| | 2HEMA | — | — | 13 |
| | AA | 1 | 5 | 0.5 |
| Tg [° C.] | | 71 | −1 | 38 |
| Mw [-] | | 8000 | 114000 | 10000 |
| Solid content [mass %] | | 52 | 50 | 54 |

[Polyol]

Polyols 1 to 6 were prepared. The polyol 1 is Placcel 205. The polyol 2 is Placcel 305. The polyol 3 is Placcel 210. The polyol 4 is Placcel 220. The polyol 5 is Placcel L320AL. The polyol 6 is Placcel 320. The polyols 1 to 6 are all products from Daicel Corporation, and the "Placcel" is a registered trademark owned by Daicel Corporation.

The polyols 1 to 6 are all polycaprolactone polyols. The solid content of each of the polyols 1 to 6 is 100 mass %. The melting temperature Tm of the polyol 1 is not higher than 10° C., and the Tm of the polyol 2 is not higher than 20° C. With regard to each of the polyols 1 to 6, the number of hydroxyl groups, hydroxyl value, and number-average molecular weight Mn are shown in Table 3.

TABLE 3

| Polyol No. | Product name | Number of hydroxyl groups | Hydroxyl value [mgKOH/g] | Mn [-] |
|---|---|---|---|---|
| 1 | Placcel 205 | Diol | 212 | 530 |
| 2 | Placcel 305 | Triol | 305 | 550 |
| 3 | Placcel 210 | Diol | 112 | 1000 |
| 4 | Placcel 220 | Diol | 56 | 2000 |
| 5 | Placcel L320AL | Triol | 85 | 2000 |
| 6 | Placcel 320 | Triol | 85 | 2000 |

[Melamine Resin]

Nikalac MS-11 was prepared as a melamine resin. Nikalac MS-11 is a product from NIPPON CARBIDE INDUSTRIES CO., INC., and the "Nikalac" is a registered trademark owned by NIPPON CARBIDE INDUSTRIES CO., INC. The Nikalac MS-11 is a methylated melamine resin solution, and the solid content thereof is 60 mass %.

[Polyisocyanate]

Polyisocyanates 1 to 6 were prepared. The polyisocyanate 1 is DURANATE D-201. The polyisocyanate 1 is a product from Asahi Kasei Corporation, and the "DURANATE" is a registered trademark owned by Asahi Kasei Corporation. The polyisocyanate 2 is TAKENATE D-120N. The polyisocyanate 3 is TAKENATE D-140N. The polyisocyanate 4 is TAKENATE D-131N. The polyisocyanate 5 is TAKENATE D-268. The polyisocyanate 6 is TAKENATE D-204EA-1. The polyisocyanates 2 to 6 are all products from Mitsui Chemicals, Inc., and the "TAKENATE" is a registered trademark owned by Mitsui Chemicals, Inc. With regard to each of the polyisocyanates 1 to 6, the amount of isocyanate group and solid content are shown in Table 4.

TABLE 4

| Polyisocyanate No. | Product name | NCO content [mass %] | Solid content [mass %] |
|---|---|---|---|
| 1 | DURANATE D-201 | 16.10 | 100 |
| 9 | TAKENATE D120N | 11.00 | 75 |
| 3 | TAKENATE D140N | 10.50 | 75 |
| 4 | TAKENATE D-131N | 14.00 | 75 |
| 5 | TAKENATE D268 | 7.50 | 50 |
| 6 | TAKENATE D204-EA-1 | 7.90 | 50 |

[Leveling Agent]

POLYFLOW No. 85HF was prepared as a leveling agent. The POLYFLOW No. 85HF is an acrylic resin-based leveling agent manufactured by KYOEISHA CHEMICAL CO., LTD. The solid content thereof is 70 mass %.

[Pigment]

Pigments 1 to 3 were prepared. The pigment 1 is FPGS-5910 black. The pigment 1 is a product from Dainichiseika Color & Chemicals Mfg. Co., Ltd. The pigment 2 is NBK-968 black. The pigment 2 is a black color base manufactured by NIKKO BICS CO., LTD. The pigment 3 is NBK-967 white. The pigment 3 is a white color base manufactured by NIKKO BIOS CO., LTD. With regard to each of the pigments 1 to 3, the names of main components and their amounts, and the solid content of the pigment are shown in Table 5.

TABLE 5

| Pigment No. | Product name | Main component Name | Amount [mass %] | Solid content [mass %] |
|---|---|---|---|---|
| 1 | FPGS-5910 black | Carbon black | 15.7 | 59 |
| 2 | NBK-968 black | Carbon black | 18 | 30 |
| 3 | NBK-967 white | Titanium oxide pigment | 58.5 | 66 |

[Preparation of Ink and Coating Liquid]

The following description will discuss Preparation Examples of inks and coating liquids using the foregoing materials. The amount of each material in the following Preparation Examples is the solid content of that material.

[Preparation of ink 1]

50 parts by mass of the acrylic resin 1 and 50 parts by mass of the polyol 6 were mixed. The amount of the polyol with respect to 100 parts by mass of the acrylic resin is 100 parts by mass. 36.6 parts by mass of the pigment 1 was added to the obtained mixture, stirred, and then 30.8 parts by mass of the polyisocyanate 4 was added. The proportion of the amount of the pigment with respect to the total amount of the acrylic resin, polyol, and polyisocyanate is 28 mass %, and the proportion of the amount of the carbon black with respect to that total amount is 7.5 mass %. The amount of the polyisocyanate, with respect to the hydroxyl groups and carboxyl groups contained in the acrylic resin and polyol, is 0.98 equivalents. To the obtained mixture, ethyl acetate was added so that the solid content would be 30 mass %, and stirred. In this way, an ink 1 was obtained.

[Preparation of Ink 2]

The same operations as the preparation of the ink 1 were carried out, except that the amount of the acrylic resin 1 was changed from 50 parts by mass to 33.3 parts by mass, that the 33.3 parts by mass of the polyol 1 and 33.3 parts by mass of the polyol 6 were used instead of 50 parts by mass of the polyol 6, that the amount of the polyisocyanate 4 was changed to 48.9 parts by mass, and that the amount of the pigment 1 was changed to 41.7 parts by mass. In this way, an ink 2 was obtained. The hydroxyl value of the polyols as a whole here is 148.5 mgKOH/g. The amount of the polyols in the ink 2, with respect to 100 parts by mass of the acrylic resin, is 200 parts by mass. The amount of the polyisocyanate, with respect to the hydroxyl groups and carboxyl groups contained in the acrylic resin and polyols, is 0.98 equivalents. The proportion of the amount of the pigment with respect to the total amount of the acrylic resin, polyols, and polyisocyanate is 28 mass %, and the proportion of the amount of the carbon black with respect to that total amount is 7.5 mass %.

[Preparation of Ink 3]

The same operations as the preparation of the ink 1 were carried out, except that the amount of the acrylic resin 1 was changed from 50 parts by mass to 33.3 parts by mass, that 33.3 parts by mass of the polyol 2 and 33.3 parts by mass of the polyol 4 were used instead of 50 parts by mass of the polyol 6, that the amount of the polyisocyanate 4 was changed to 57.5 parts by mass, and that the amount of the pigment 1 was changed to 44.1 parts by mass. In this way, an ink 3 was obtained. The hydroxyl value of the polyols as a whole here is 180.5 mgKOH/g. The amount of the polyols in the ink 3, with respect to 100 parts by mass of the acrylic resin, is 200 parts by mass. The amount of the polyisocyanate, with respect to the hydroxyl groups and carboxyl groups contained in the acrylic resin and polyols, is 0.98 equivalents. The proportion of the amount of the pigment with respect to the total amount of the acrylic resin, polyols, and polyisocyanate is 28 mass %, and the proportion of the amount of the carbon black with respect to that total amount is 7.5 mass %.

[Preparation of Ink 4]

The same operations as the preparation of the ink 1 were carried out, except that the amount of the acrylic resin 1 was changed from 50 parts by mass to 33.3 parts by mass, that 33.3 parts by mass of the polyol 2 and 33.3 parts by mass of the polyol 3 were used instead of 50 parts by mass of the polyol 6, that the amount of the polyisocyanate 4 was changed to 65.0 parts by mass, and that the amount of the pigment 1 was changed to 46.4 parts by mass. In this way, an ink 4 was obtained. The hydroxyl value of the polyols as a whole here is 208.5 mgKOH/g. The amount of the polyols in the ink 4, with respect to 100 parts by mass of the acrylic resin, is 200 parts by mass. The amount of the polyisocyanate, with respect to the hydroxyl groups and carboxyl groups contained in the acrylic resin and polyols, is 0.98 equivalents. The proportion of the amount of the pigment with respect to the total amount of the acrylic resin, polyols, and polyisocyanate is 28 mass %, and the proportion of the amount of the carbon black with respect to that total amount is 7.5 mass %.

[Preparation of Ink 5]

The same operations as the preparation of the ink 1 were carried out, except that the amount of the acrylic resin 1 was changed from 50 parts by mass to 60 parts by mass, that the amount of the polyol 6 was changed from 50 parts by mass to 40 parts by mass, that the amount of the polyisocyanate 4 was changed to 30.2 parts by mass, that 18.1 parts by mass of the pigment 2 was used instead of 36.6 parts by mass of the pigment 1, and that 2.8 parts by mass of a leveling agent was added. In this way, an ink 5 was obtained. The amount of the polyol in the ink 5, with respect to 100 parts by mass of the acrylic resin, is 67 parts by mass. The amount of the polyisocyanate, with respect to the hydroxyl groups and carboxyl groups contained in the acrylic resin and polyol, is 0.98 equivalents. The proportion of the amount of the pigment with respect to the total amount of the acrylic resin, polyol, and polyisocyanate is 14 mass %, and the proportion of the amount of the carbon black with respect to that total amount is 8.4 mass %.

[Preparation of ink 6]

The same operations as the preparation of the ink 5 were carried out, except that the amount of the acrylic resin 1 was changed from 60 parts by mass to 70 parts by mass, that the amount of the polyol 6 was changed from 40 parts by mass to 30 parts by mass, and that the amount of the polyisocyanate 4 was changed to 15.1 parts by mass. In this way, an ink 6 was obtained. The amount of the polyol in the ink 6, with respect to 100 parts by mass of the acrylic resin, is 43 parts by mass. The amount of the polyisocyanate, with respect to the hydroxyl groups and carboxyl groups contained in the acrylic resin and the polyol, is 0.50 equivalents. The proportion of the amount of the pigment with respect to the total amount of the acrylic resin, polyol, and polyisocyanate is 14 mass %, and the proportion of the amount of the carbon black with respect to that total amount is 8.4 mass %.

[Preparation of Ink 7]

The same operations as the preparation of the ink 6 were carried out, except that the amount of the polyisocyanate 4 was changed to 29.5 parts by mass and that the amount of the pigment 2 was changed to 16.1 parts by mass. In this way, an ink 7 was obtained. The amount of the polyol in the ink 7, with respect to 100 parts by mass of the acrylic resin, is 43 parts by mass. The amount of the polyisocyanate, with respect to the hydroxyl groups and carboxyl groups contained in the acrylic resin and polyol, is 0.98 equivalents. The proportion of the amount of the pigment with respect to the total amount of the acrylic resin, polyol, and polyisocyanate is 14 mass %, and the proportion of the amount of the carbon black with respect to that total amount is 8.4 mass %.

[Preparation of Ink 8]

The same operations as the preparation of the ink 1 were carried out, except that 9.2 parts by mass of the pigment 2 was used instead of 36.6 parts by mass of the pigment 1 and that 2.8 parts by mass of a leveling agent was added. In this way, an ink 8 was obtained. The amount of the polyol in the ink 8, with respect to 100 parts by mass of the acrylic resin, is 100 parts by mass. The amount of the polyisocyanate, with respect to the hydroxyl groups and carboxyl groups contained in the acrylic resin and polyol, is 0.98 equivalents. The proportion of the amount of the pigment with respect to the total amount of the acrylic resin, polyol, and polyisocyanate is 7 mass %, and the proportion of the amount of the carbon black with respect to that total amount is 4.2 mass %.

[Preparation of Ink 9]

The same operations as the preparation of the ink 1 were carried out, except that 50 parts by mass of the acrylic resin 3 was used instead of 50 parts by mass of the acrylic resin 1, that the amount of the polyisocyanate 4 was changed to 17.1 parts by mass, that 32.8 parts by mass of the pigment 2 was used instead of 36.6 parts by mass of the pigment 1, and that 2.8 parts by mass of a leveling agent was added. In this way, an ink 9 was obtained. The amount of the polyol in the ink 9, with respect to 100 parts by mass of the acrylic resin, is 100 parts by mass. The amount of the polyisocyanate, with respect to the hydroxyl groups and carboxyl groups contained in the acrylic resin and polyol, is 0.98 equivalents. The proportion of the amount of the pigment with respect to the total amount of the acrylic resin, polyol, and polyisocyanate is 28 mass %, and the proportion of the amount of the carbon black with respect to that total amount is 16.8 mass %.

[Preparation of Ink 10]

The same operations as the preparation of the ink 1 were carried out, except that 50 parts by mass of the acrylic resin 1 and 25 parts by mass of the acrylic resin 2 were used instead of 50 parts by mass of the acrylic resin 1, that the amount of the polyol was changed to 25.0 parts by mass, that 24.2 parts by mass of the polyisocyanate 1 and 41.8 parts by mass of the polyisocyanate 3 were used instead of 30.8 parts by mass of the polyisocyanate 4, that 47.3 parts by mass of the pigment 2 was used instead of 36.6 parts by mass of the pigment 1, and that 2.8 parts by mass of a leveling agent was added. In this way, an ink 10 was obtained. The amount of the polyol in the ink 10, with respect to 100 parts by mass of the acrylic resins, is 33 parts by mass. The amount of the polyisocyanates, with respect to the hydroxyl groups and carboxyl groups contained in the acrylic resins and polyol, is 1.75 equivalents. The proportion of the amount of the pigment with respect to the total amount of the acrylic resins, polyol, and polyisocyanates is 28 mass %, and the proportion of the amount of the carbon black with respect to that total amount is 16.8 mass %.

[Preparation of Ink 11]

The same operations as the preparation of the ink 1 were carried out, except that 12.0 parts by mass of the polyisocyanate 5 was used instead of 30.8 parts by mass of the polyisocyanate 4, that 22.4 parts by mass of the pigment 2 was used instead of 36.6 parts by mass of the pigment 1, and that 2.8 parts by mass of a leveling agent was added. In this way, an ink 11 was obtained. The amount of the polyol in the ink 11, with respect to 100 parts by mass of the acrylic resin, is 100 parts by mass. The amount of the polyisocyanate, with respect to the hydroxyl groups and carboxyl groups contained in the acrylic resin and polyol, is 0.98 equivalents. The proportion of the amount of the pigment with respect to the total amount of the acrylic resin, polyol, and polyisocyanate is 20 mass %, and the proportion of the amount of the carbon black with respect to that total amount is 12.0 mass %.

[Preparation of ink 12]

The same operations as the preparation of the ink 1 were carried out, except that 9.0 parts by mass of the polyisocyanate 3 was used instead of 30.8 parts by mass of the polyisocyanate 4, that 16.1 parts by mass of the pigment 2 and 46.0 parts by mass of the pigment 3 were used instead of 36.6 parts by mass of the pigment 1, and that 2.8 parts by mass of a leveling agent was added. In this way, an ink 12 was obtained. The amount of the polyol in the ink 12, with respect to 100 parts by mass of the acrylic resin, is 100 parts by mass. The amount of the polyisocyanate, with respect to the hydroxyl groups and carboxyl groups contained in the acrylic resin and polyol, is 0.98 equivalents. The proportion of the amount of the pigment 2 with respect to the total amount of the acrylic resin, polyol, and polyisocyanate is 14 mass %, the proportion of the amount of the pigment 3 with respect to that total amount is 16.1 mass %, and the proportion of the amount of the carbon black with respect to that total amount is 8.4 mass %.

[Preparation of Ink 13]

The same operations as the preparation of the ink 1 were carried out, except that the amount of the acrylic resin 1 was changed from 50 parts by mass to 80 parts by mass, that 20 parts by mass of the polyol 2 was used instead of 50 parts by mass of the polyol 6, that the amount of the polyisocyanate 4 was changed from 30.8 parts by mass to 46.5 parts by mass, that the amount of the pigment 1 was changed from 36.6 parts by mass to 41.0 parts by mass, and that 2.8 parts by mass of a leveling agent was added. In this way, an ink 13 was obtained. The amount of the polyol in the ink 13, with respect to 100 parts by mass of the acrylic resin, is 25 parts by mass. The amount of the polyisocyanate, with respect to the hydroxyl groups and carboxyl groups contained in the acrylic resin and polyol, is 0.98 equivalents. The proportion of the amount of the pigment with respect to the total amount of the acrylic resin, polyol, and polyisocyanate is 28 mass %, and the proportion of the amount of the carbon black with respect to that total amount is 7.5 mass %.

[Preparation of Ink 14]

The same operations as the preparation of the ink 12 were carried out, except that 21.3 parts by mass of a melamine resin was used instead of the polyisocyanate and that the pigment 3 was not used. In this way, an ink 14 was obtained. The amount of the polyol in the ink 14, with respect to 100 parts by mass of the acrylic resin, is 100 parts by mass. The amount of the melamine resin is such that the amount of methylol group of the melamine resin, with respect to the hydroxyl groups and carboxyl groups contained in the acrylic resin and polyol, is 0.98 equivalents. The proportion of the amount of the pigment with respect to the total amount of the acrylic resin, polyol, and polyisocyanate is 14 mass %, and the proportion of the amount of the carbon black with respect to that total amount is 8.4 mass %.

[Preparation of Ink 15]

The same operations as the preparation of the ink 1 were carried out, except that the amount of the acrylic resin 1 was changed to 100 parts by mass, that the polyol was not used, that the amount of the polyisocyanate 4 was changed to 27.6 parts by mass, that the amount of the pigment 1 was changed to 35.7 parts by mass, and that 2.8 parts by mass of a leveling agent was added. In this way, an ink 15 was obtained. The amount of the polyol in the ink 15, with respect to 100 parts by mass of the acrylic resin, is 0 parts by mass. The amount of the polyisocyanate, with respect to the hydroxyl groups and carboxyl groups contained in the acrylic resin and polyol, is 0.98 equivalents. The proportion of the amount of the pigment 2 with respect to the total amount of the acrylic resin, polyol, and polyisocyanate is 14 mass %, and the proportion of the amount of the carbon black with respect to that total amount is 8.4 mass %.

[Preparation of Ink 16]

The same operations as the preparation of the ink 13 were carried out, except that the leveling agent was not used and that 146.5 parts by mass of the pigment 3 was used instead of 41.0 parts by mass of the pigment 1. In this way, an ink 16 was obtained. The amount of the polyol in the ink 16, with respect to 100 parts by mass of the acrylic resin, is 25 parts by mass. The amount of the polyisocyanate, with respect to the hydroxyl groups contained in the polyol, is 0.98 equivalents. The proportion of the amount of the pigment with respect to the total amount of the acrylic resin, polyol, and polyisocyanate is 100 mass %.

The compositions of the inks 1 to 8 are shown in Table 6, and the compositions of the inks 9 to 16 are shown in Table 7. In the tables, "polyol ratio" means the ratio of the amount of polyol(s) to 100 parts by mass of the acrylic resin(s). The "NCO ratio in equivalent" means the ratio of the isocyanate group contained in the polyisocyanate to the hydroxyl group and carboxyl group contained in the acrylic resin and polyol. Note, however, that with regard to the ink 14, the "NCO ratio in equivalent" means the ratio of the methylol group contained in the melamine resin to the hydroxyl group and carboxyl group contained in the acrylic resin and polyol. The "black pigment ratio" means the ratio of the amount of the black pigment to the total amount of the acrylic resin(s), polyol(s), and polyisocyanate(s). The "white pigment ratio" means the ratio of the amount of the white pigment to the total amount of the acrylic resin(s), polyol(s), and polyisocyanate(s). The "CB ratio" means the ratio of the amount of the carbon black to the total amount of the acrylic resin(s), polyol(s), and polyisocyanate(s). Note, however, that the CB ratio with regard to the ink 16 in Table 7 is the proportion of titanium oxide contained in the white pigment.

TABLE 6

| Ink No. | | 1 | 2 | 3 | 4 | 5 | 6 | 7 | 8 |
|---|---|---|---|---|---|---|---|---|---|
| Acrylic resin | 1 | 50.0 | 33.3 | 33.3 | 33.3 | 60.0 | 70.0 | 70.0 | 50.0 |
| | 2 | — | — | — | — | — | — | — | — |
| | 3 | — | — | — | — | — | — | — | — |
| Polyol | 1 | — | 33.3 | — | — | — | — | — | — |
| | 2 | — | — | 33.3 | 33.3 | — | — | — | — |
| | 3 | — | — | — | 33.3 | — | — | — | — |
| | 4 | — | — | 33.3 | — | — | — | — | — |
| | 5 | — | — | — | — | — | — | — | — |
| | 6 | 50.0 | 33.3 | — | — | 40.0 | 30.0 | 30.0 | 50.0 |
| Melamine resin | | — | — | — | — | — | — | — | — |
| Poly-isocyanate | 1 | — | — | — | — | — | — | — | — |
| | 2 | — | — | — | — | — | — | — | — |
| | 3 | — | — | — | — | — | — | — | — |
| | 4 | 30.8 | 48.9 | 57.5 | 65.0 | 30.2 | 15.1 | 29.5 | 30.8 |
| | 5 | — | — | — | — | — | — | — | — |
| | 6 | — | — | — | — | — | — | — | — |
| Leveling agent | | — | — | — | — | 2.8 | 2.8 | 2.8 | 2.8 |
| Pigment | 1 | 36.6 | 41.7 | 44.1 | 46.4 | — | — | — | — |
| | 2 | — | — | — | — | 18.1 | 18.1 | 16.1 | 9.2 |
| | 3 | — | — | — | — | — | — | — | — |
| Polyol ratio [mass %] | | 100 | 200 | 200 | 200 | 67 | 43 | 43 | 100 |
| NCO ratio in equivalent [—] | | 0.98 | 0.98 | 0.98 | 0.98 | 0.98 | 0.50 | 0.98 | 0.98 |

TABLE 6-continued

| Ink No. | 1 | 2 | 3 | 4 | 5 | 6 | 7 | 8 |
|---|---|---|---|---|---|---|---|---|
| Black pigment ratio [mass %] | 28 | 28 | 28 | 28 | 14 | 14 | 14 | 7 |
| CB ratio [mass %] | 7.5 | 7.5 | 7.5 | 7.5 | 8.4 | 8.4 | 8.4 | 4.2 |

TABLE 7

| Ink No. | | 9 | 10 | 11 | 12 | 13 | 14 | 15 | 16 |
|---|---|---|---|---|---|---|---|---|---|
| Acrylic resin | 1 | — | 50.0 | 50.0 | 50.0 | 80.0 | 50.0 | 100.0 | 80.0 |
| | 2 | — | 25.0 | — | — | — | — | — | — |
| | 3 | 50.0 | — | — | — | — | — | — | — |
| Polyol | 1 | — | — | — | — | — | — | — | — |
| | 2 | — | — | — | — | 20.0 | — | — | 20.0 |
| | 3 | — | — | — | — | — | — | — | — |
| | 4 | — | — | — | — | — | — | — | — |
| | 5 | — | — | 50.0 | 50.0 | — | 50.0 | — | — |
| | 6 | 50.0 | 25.0 | — | — | — | — | — | — |
| Melamine resin | | — | — | — | — | — | 21.3 | — | — |
| Poly-isocyanate | 1 | — | 24.2 | — | — | — | — | — | — |
| | 2 | — | — | — | — | — | — | — | — |
| | 3 | — | 41.8 | — | 9.0 | — | — | — | — |
| | 4 | 17.1 | — | — | — | 46.5 | — | 27.6 | 46.5 |
| | 5 | — | — | 12.0 | — | — | — | — | — |
| | 6 | — | — | — | 6.0 | — | — | — | — |
| Leveling agent | | 2.8 | 2.8 | 2.8 | 3.0 | 2.8 | 3.0 | 2.8 | — |
| Pigment | 1 | — | — | — | — | 41.0 | — | 35.7 | — |
| | 2 | 32.8 | 47.3 | 22.4 | 16.1 | — | 16.1 | — | — |
| | 3 | — | — | — | 46.0 | — | — | — | 146.5 |
| Polyol ratio [mass %] | | 100 | 33 | 100 | 100 | 25 | 100 | — | 25 |
| NCO raio in equivalent [—] | | 0.98 | 1.75 | 0.98 | 0.98 | 0.98 | 0.98 | 0.98 | 0.98 |
| Black pigment ratio [mass %] | | 28 | 28 | 20 | 14 | 28 | 14 | 28 | — |
| White pigment ratio [mass %] | | — | — | — | 40 | — | — | — | 146.5 |
| CB ratio [mass %] | | 16.8 | 16.8 | 12.0 | 8.4 | 7.5 | 8.4 | 7.5 | *100 |

[Preparation of Coating Liquid]

The following components in the following amounts were mixed together, and diluted with ethyl acetate so that the solid content would be 35 mass %. In this way, a black coating liquid was prepared. Note that the coating liquid is an ink containing a coloring pigment and an adhesive, and is a liquid material for forming a colored (black) adhesive layer.

Nissetsu KP-982: 100.0 parts by mass
CoronateL-45E: 3.3 parts by mass
NX-591 black: 32.0 parts by mass The "Nissetsu KP-982" is an acrylic pressure sensitive adhesive manufactured by NIPPON CARBIDE INDUSTRIES CO., INC. The "Coronate L-45E" is an isocyanate crosslinking agent manufactured by TOSOH CORPORATION. The "NX-591 black" is a black color base manufactured by Dainichiseika Color & Chemicals Mfg. Co., Ltd., and its carbon black content is 43.9 mass %.

Example 12

The ink 1 was applied to one surface of "COSMOSHINE A4300" (which is a 50 μm-thick PET film having easily adhering surfaces on both sides, manufactured by TOYO BOSEKI CO., LTD.) ("COSMOSHINE" is a registered trademark owned by TOYO BOSEKI CO., LTD.) so that the thickness of a dried film would be 2 μm, and dried at 150° C. for 1 minute. In this way, a coating film obtained from the ink 1 was formed.

Next, the ink 16 was applied to the coating film obtained from the ink 1 so that the thickness of a dried film would be 15 μm, and dried at 150° C. for 3 minutes. In this way, a coating film obtained from the ink 16 was formed. Next, the PET film having the coating films thereon was cured at 60° C. for 3 days. In this way, a coated film 2-1 including the PET film, the coating film obtained from the ink 1, and the coating film obtained from the ink 16 which are stacked in the order named was obtained.

On the other hand, the foregoing coating liquid was applied to a surface of release paper (EK-B, manufactured by LINTEC Corporation) so that the thickness of a dried film would be 20 μm, and dried at 100° ° C. for 1 minute. In this way, a coating film obtained from the coating liquid was formed on the release paper. Next, the coating film obtained from the coating liquid was attached to a surface of the PET of the coated film 2-1. In this way, a laminate 2-1 for laser printing including the release paper, the coating film obtained from the coating liquid, the PET film, the coating film obtained from the ink 1, and the coating film obtained from the ink 16 which are stacked in the order named, as illustrated in FIG. 3, was obtained.

Examples 13 to 18, 20 to 22, 24, and 251

The same operations as described for the laminate 2-1 were carried out, except that each of the inks 2 to 7 and 9 to 13 was used instead of the ink 1. In this way, Laminates 2-2 to 2-7, 2-9 to 2-11, 2-13, and 2-14, respectively, were obtained.

Example 19

The ink 8 was applied to one surface of a COSMOSHINE A4300 so that the thickness of a dried film would be 2 µm, and dried at 150° C. for 1 minute. In this way, a coating film obtained from the ink 8 was formed. Next, the ink 8 was further applied to the coating film obtained from the ink 8 so that the thickness of a dried film would be 2 µm, and cured at 40° C. for 3 days. In this way, a coating film obtained from the ink 8 was formed on the one surface of the COSMOSHINEA4300.

Next, a coating film obtained from the ink 16 was formed on the coating film obtained from the ink 8 in the same manner as the laminate 2-1 to obtain a coated film 2-8 including the PET film, the coating film obtained from the ink 8, and the coating film obtained from the ink 16 stacked in the order named. Next, in the same manner as the laminate 2-1, a laminate 2-8 for laser printing including the release paper, the coating film obtained from the coating liquid, the PET film, the coating film obtained from the ink 8, and the coating film obtained from the ink 16 which are stacked in the order named was obtained.

Example 23

Both surfaces of a 50 µm-thick PET film "PET S-50" (manufactured by UNITIKA LTD.) were subjected to a corona treatment. Next, a coated film 2-12 was prepared and a laminate 2-12 was obtained in the same manner as the laminate 2-1.

[Comparative Examples 5 and 6]

The same operations as described for the laminate 2-1 were carried out, except that the ink 14 was used instead of the ink 1, to obtain a laminate 2-C1. Furthermore, the same operations as described for the laminate 2-1 were carried out, except that the ink 15 was used instead of the ink 1, to obtain a laminate 2-C2.

[Evaluation]
[Printability]

With regard to each of the laminates 2-1 to 2-14, 2-C1, and 2-C2, with use of a fiber laser marker LP-Z130 (manufactured by Panasonic Corporation), the laminate was irradiated with short wavelength laser from the side where the coating film obtained from the ink 16 is located, under the conditions in which the power level was 20%, pulse period was 50 microseconds, line width was 0.07 mm, and 1000 mm/second. In this way, a set of alphabetic characters measuring 5 mm×5 mm and a two-dimensional code with an error correction level of 30% including a part measuring 10 mm×10 mm were printed. In this way, a test piece was prepared.

Then, the characters and the two-dimensional code printed on the test piece were visually checked by skilled persons. Furthermore, the operation of reading the two-dimensional code printed on the test piece was carried out using a two-dimensional code reader (product name: SR-H60W, manufactured by KEYENCE CORPORATION). Then, the printability on the laminate was evaluated on the basis of the following criteria. It can be said that a laminate in which the two-dimensional code is visually recognizable is acceptable for practical use.

S: It was possible to visually recognize the printed characters and possible to read the two-dimensional code with the two-dimensional code reader. In addition, the edges of the printed characters were well defined.

A: It was possible to visually recognize the printed characters and possible to read the two-dimensional code with the two-dimensional code reader; however, the edges of the printed characters were somewhat non-smooth.

B: It was possible to visually recognize the printed characters and the two-dimensional code, but not possible to read the two-dimensional code with the two-dimensional code reader.

C: It was difficult to visually recognize the printed characters, and it was not possible to read the two-dimensional code with the two-dimensional code reader.

[Adhesion (Tape Peel Resistance)]

The foregoing test piece was prepared using each of the laminates 2-1 to 2-14, 2-C1, and 2-C2. Next, a piece of 24 mm-width adhesive cellophane tape "CELLOTAPE CT-24" (manufactured by NICHIBAN Co., Ltd., "CELLOTAPE" is a registered trademark owned by NICHIBAN Co., Ltd.) was firmly attached to the part with the two-dimensional code of the test piece. Next, the adhesive cellophane tape was pulled quickly at an angle of 45° to the direction of a flat surface of the test piece, and thereby removed. The characters and the two-dimensional code on the test piece from which the adhesive cellophane tape had been removed were visually checked by skilled persons. Furthermore, the operation of reading the two-dimensional code printed on the test piece from which the adhesive cellophane tape had been removed was carried out, with use of a two-dimensional code reader (product name: SR-H60W, manufactured by KEYENCE CORPORATION). Then, the adhesion of the laminate was judged on the basis of the following criteria. It can be said that, if the two-dimensional code is readable even after the adhesive cellophane tape has been removed, that laminate is acceptable for practical use.

S: There were no peeled off flakes on the adhesive cellophane tape, and it was possible to read the two-dimensional code.

A: There were a few peeled off flakes on the adhesive cellophane tape, but there were no missing parts in the two-dimensional code and it was possible to read the two-dimensional code.

B: There were peeled off flakes on the adhesive cellophane tape, and there were a few missing parts in the print portion; however, it was possible to read the two-dimensional code.

C: The coating film came off and it was not possible to read the two-dimensional code.

[Adhesion (Scratch Resistance)]

Coating films obtained from the inks 1 to 15 corresponding to the laminates 2-1 to 2-14, 2-C1, and 2-C2 were formed on PET films corresponding to those laminates. Next, after the coating films were formed, skilled persons scratched each coating film with their nail and observed the scratched part. Then, the adhesion of the second layer was judged on the basis of the following criteria with regard to the laminates corresponding to the coating films obtained from the inks 1 to 15 on the PET films. It can be said that, if the base material is hidden from sight from the side where the coating film obtained from the ink is located, that laminate is acceptable for practical use.

S: There was no scratch in the scratched coating film obtained from the ink.

A: There was a scratch in the scratched coating film obtained from the ink, but the coating film obtained from the ink did not come off.

B: The scratched coating film obtained from the ink was partially shaved off, but the base material was not visible from the side where the coating film obtained from the ink was located.

C: The scratched coating film obtained from the ink came off, and the base material was visible from the side where the coating film obtained from the ink was located.

The main layer configurations of the respective laminates 2-1 to 2-14, 2-C1, and 2-C2 and the results of the foregoing evaluations are shown in Table 8.

TABLE 8

| Laminate No. | Materials for main layers | | | Print-ability | Adhesion | | Scratch resistance |
|---|---|---|---|---|---|---|---|
| | Base material layer | Second layer | First layer | | Tape peel resistance | | |
| 2-1 | A4300 | Ink 1 | Ink 16 | S | S | | S |
| 2-2 | A4300 | Ink 2 | Ink 16 | A | S | | A |
| 2-3 | A4300 | Ink 3 | Ink 16 | A | A | | A |
| 2-4 | A4300 | Ink 4 | Ink 16 | A | A | | A |
| 2-5 | A4300 | Ink 5 | Ink 16 | S | S | | A |
| 2-6 | A4300 | Ink 6 | Ink 16 | A | S | | A |
| 2-7 | A4300 | Ink 7 | Ink 16 | A | A | | A |
| 2-8 | A4300 | Ink 8 | Ink 16 | A | S | | A |
| 2-9 | A4300 | Ink 9 | Ink 16 | A | A | | B |
| 2-10 | A4300 | Ink 10 | Ink 16 | A | A | | A |
| 2-11 | A4300 | Ink 11 | Ink 16 | S | S | | S |
| 2-12 | S-50 | Ink 11 | Ink 16 | S | S | | S |
| 2-13 | A4300 | Ink 12 | Ink 16 | A | S | | S |
| 2-14 | A4300 | Ink 13 | Ink 16 | A | B | | A |
| 2-C1 | A4300 | Ink 14 | Ink 16 | B | C | | A |
| 2-C2 | A4300 | Ink 15 | Ink 16 | B | C | | C |

[Discussion]

As shown in Table 8, all the laminates 2-1 to 2-14 have sufficient printability and adhesion.

Furthermore, it is understood from, for example, the laminate 2-8 and the laminate 2-9 that a good laminate acceptable for practical use is obtained when the CP ratio is within the range of 4 mass % to 17 mass %.

Furthermore, it is understood from, for example, the laminate 2-6 and the laminate 2-10 that a good laminate acceptable for practical use is obtained when the NCO ratio in equivalent is within the range of 0.5 to 2.0.

Furthermore, it is understood from, for example, the laminate 2-1 and the laminate 2-9 that there is a tendency that when the Tg of the acrylic acid is high, the adhesion is also high. A reason therefor is inferred to be that when the Tg of the acrylic acid is higher, the drying property of the ink of the second layer is better.

On the contrary, each of the laminates 2-C1 and 2-C2 is inferior in printability to the laminates 2-1 to 2-14, although the printability of each of the laminates 2-C1 and 2-C2 is sufficient. Furthermore, each of the laminates 2-C1 and 2-C2 has insufficient adhesion.

The laminate 2-C1 is insufficient in tape peel resistance, which is one of the evaluations on adhesion. A reason therefor is inferred to be that a sufficient crosslinked structure is formed in each of the first and second layers and therefore the strengths of the first and second layers and the adhesion between the first and second layers are sufficient but the adhesion of the second layer to the base material layer is insufficient.

The laminate 2-C2 is insufficient in both evaluations on adhesion. A reason therefor is inferred to be that a cross-linked structure in each of the first and second layers is not constructed sufficiently and therefore the strengths of the first and second layers and the adhesion of the second layer to the base material layer are both insufficient.

INDUSTRIAL APPLICABILITY

The present invention can be suitably used in indicating product information (manufacturer's serial number, lot number, and the like) on industrial products.

REFERENCE SIGNS LIST 1, 10, 100 laminate
11, 31 first layer
12, 32 second layer
13, 33 base material layer
20 label
21 print portion
30 hole
34 adhesive layer
35 release layer
51 white layer
52 PET film
53 black layer
54 transparent adhesive layer
55 release paper
B arrow which indicates the direction in which laser light travels and the position to be irradiated with the laser light

The invention claimed is:

1. A laminate for laser printing, comprising:
a first layer having a property of shielding against laser light;
a second layer having a property of absorbing the laser light;
a base material layer which is optically transparent; and
a third layer having a property of absorbing the laser light,
the first layer, the second layer, the base material layer, and the third layer being stacked in the order named,
the second layer having a thickness of not more than 15 µm,
the third layer having the same hue as the second layer, and
the third layer further has a visible color difference from the first layer.

2. The laminate as set forth in claim 1, wherein the second layer contains an organic pigment that has the property of absorbing the laser light.

3. The laminate as set forth in claim 2, wherein the second layer contains carbon black.

4. The laminate as set forth in claim 1, wherein the first layer contains a metal oxide and/or a metal.

5. The laminate as set forth in claim 4, wherein the first layer contains titanium oxide.

6. The laminate as set forth in claim 1, wherein the third layer further has an adhesive property.

7. A label comprising a print portion which has been formed by irradiating a laminate as set forth in claim 1 with the laser light, the print portion is a portion in which the base material layer is exposed when seen from a side where the first layer is located.

8. A laminate for laser printing, comprising:
a first layer having a property of shielding against laser light;
a second layer having a property of absorbing the laser light; and
a base material layer which is optically transparent,
the first layer, the second layer, and the base material layer being stacked in the order named,
the second layer containing a resin composition that contains a resin and a pigment that has a property of absorbing the laser light,
the resin containing a resin component that has a structure of a reaction product of an acrylic resin, a polycaprolactone polyol, and a polyisocyanate.

9. The laminate as set forth in claim 8, wherein the resin contains structural unit of the polycaprolactone polyol in an amount of not less than 40 parts by mass and not more than 200 parts by mass with respect to 100 parts by mass of the acrylic resin.

10. The laminate as set forth in claim 8, wherein the polycaprolactone polyol has a number-average molecular weight of not less than 1000 and not more than 4000.

11. The laminate as set forth in claim 8, wherein the polycaprolactone polyol has a hydroxyl value of not less than 50 mgKOH/g and not more than 200 mgKOH/g.

12. The laminate as set forth in claim 8, wherein the acrylic resin has a glass transition temperature of not lower than 30° C. and not higher than 100° C.

13. The laminate as set forth in claim 8, wherein:
the pigment is carbon black; and
an amount of the pigment contained in the resin composition is not less than 4 mass % and not more than 17 mass % with respect to a total amount of the resin.

14. The laminate as set forth in claim 8, wherein the resin component contains not less than 0.5 equivalents and not more than 2.0 equivalents of isocyanate groups with respect to hydroxyl groups and carboxyl groups contained in the acrylic resin and the polycaprolactone polyol.

15. The laminate as set forth in claim 8, wherein the base material layer contains an ester-based resin.

16. The laminate as set forth in claim 15, wherein the ester-based resin is an aromatic ester-based resin.

17. The laminate as set forth in claim 16, wherein the aromatic ester-based resin is polyethylene terephthalate.

* * * * *